(12) United States Patent
Li

(10) Patent No.: US 11,812,264 B2
(45) Date of Patent: Nov. 7, 2023

(54) RESOURCE ACCESS METHOD AND APPARATUS

(71) Applicant: Huawei Cloud Computing Technologies Co., Ltd., Gui'an New District (CN)

(72) Inventor: Kepeng Li, Shenzhen (CN)

(73) Assignee: Huawei Cloud Computing Technologies Co., Ltd., Gul'an New District (CN)

( * ) Notice: Subject to any disclaimer, the term of this patent is extended or adjusted under 35 U.S.C. 154(b) by 0 days.

(21) Appl. No.: 17/373,460

(22) Filed: Jul. 12, 2021

(65) Prior Publication Data

US 2021/0345111 A1 Nov. 4, 2021

Related U.S. Application Data

(63) Continuation of application No. 16/748,134, filed on Jan. 21, 2020, now Pat. No. 11,082,848, which is a (Continued)

(51) Int. Cl.
*H04W 12/069* (2021.01)
*H04W 4/70* (2018.01)
*H04L 9/40* (2022.01)
*H04L 47/80* (2022.01)
*H04L 67/12* (2022.01)

(52) U.S. Cl.
CPC ............. *H04W 12/069* (2021.01); *H04L 9/40* (2022.05); *H04L 47/80* (2013.01); *H04L 63/0884* (2013.01); *H04L 63/0892* (2013.01); *H04L 67/12* (2013.01); *H04W 4/70* (2018.02)

(58) Field of Classification Search
CPC ....... H04L 63/0884; H04L 9/40; H04L 47/80; H04L 63/0892; H04L 67/12; H04L 63/102; H04W 12/069
See application file for complete search history.

(56) References Cited

U.S. PATENT DOCUMENTS 11,082,848 B2 * 8/2021 Li ..................... H04L 63/0884
2003/0149880 A1 8/2003 Shamsaasef et al.
(Continued)

FOREIGN PATENT DOCUMENTS

CN 1588853 A 3/2005
CN 102142067 A 8/2011
(Continued)

OTHER PUBLICATIONS

Hardt, Dick. The OAuth 2.0 authorization framework. No. rfc6749. 2012. (Year: 2012).*
(Continued)

*Primary Examiner* — Soe Hlaing
(74) *Attorney, Agent, or Firm* — Slater Matsil, LLP

(57) ABSTRACT

The present invention relates to the field of communication technologies, and particularly, to a resource access method and apparatus. In the solution, even if a client cannot directly communicate with an authorization server, the client can still initiate authorization verification to the authorization server by using a resource server. Then, the resource server returns a resource access response to the client when receiving an authorization response returned by the authorization server.

20 Claims, 14 Drawing Sheets

Related U.S. Application Data continuation of application No. 15/494,638, filed on Apr. 24, 2017, now Pat. No. 10,587,531, which is a continuation of application No. PCT/CN2014/089466, filed on Oct. 24, 2014.

(56) References Cited

U.S. PATENT DOCUMENTS

| | | | |
|---|---|---|---|
| 2005/0132201 | A1 | 6/2005 | Pitman et al. |
| 2009/0323962 | A1 | 12/2009 | Aciicmez et al. |
| 2010/0097463 | A1 | 4/2010 | Tsuzuki et al. |
| 2010/0263035 | A1 | 10/2010 | Tock et al. |
| 2013/0007846 | A1* | 1/2013 | Murakami ........ H04W 12/0431 726/4 |
| 2013/0067568 | A1 | 3/2013 | Obasanjo et al. |
| 2013/0086645 | A1 | 4/2013 | Srinivasan et al. |
| 2013/0179557 | A1 | 7/2013 | Bian et al. |
| 2014/0109194 | A1 | 4/2014 | Manton |
| 2014/0298037 | A1 | 10/2014 | Xiao et al. |
| 2014/0372382 | A1 | 12/2014 | Hrebicek et al. |
| 2015/0082043 | A1* | 3/2015 | Wang ................ H04L 63/0823 713/175 |
| 2015/0235011 | A1 | 8/2015 | Swaminathan et al. |

FOREIGN PATENT DOCUMENTS

| | | |
|---|---|---|
| CN | 102186164 A | 9/2011 |
| CN | 102404726 A | 4/2012 |
| CN | 102497374 A | 6/2012 |
| CN | 102546648 A | 7/2012 |
| CN | 102835075 A | 12/2012 |
| CN | 102984199 A | 3/2013 |
| CN | 103166931 A | 6/2013 |
| CN | 103475666 A | 12/2013 |
| CN | 103685204 A | 3/2014 |
| CN | 103686718 A | 3/2014 |
| CN | 103795692 A | 5/2014 |
| CN | 203858753 U | 10/2014 |
| CN | 106537864 B | 11/2019 |
| EP | 1501002 A2 | 1/2005 |
| EP | 2779529 | 9/2014 |

OTHER PUBLICATIONS

Faynberg, I et al., "On Dynamic Access Control in Web 2.0 and Beyond: Trends and Technologies", Bell Labs Technical Journal, vol. 16, No. 2, 2011, pp. 199-218.

Gerdes, S. et al., "Delegated CoAP Authentication and Authorization Framework (DCAF) Draft-Gerdes-Ace-DCAF-Authorize-00", ACE Working Group, Internet-Draft, Jul. 4, 2014, 37 pages.

Gerdes, S. et al., "An Architecture for Authorization in Constrained Environments Draft-Gerdes-Ace-Actors-05", ACE Working Group, Internet-Draft, Apr. 29, 2015, 30 pages.

Gerdes, S. et al.,"Delegated CoAP Authentication and Authorization Framework (DCAF) Draft-Gerdes-Ace-DCAF-Authorize-04", ACE Working Group, Internet-Draft, Oct. 19, 2015, 46 pages.

Hardt, D., "The OAuth 2.0 Authorization Framework", Internet Engineering Task Force (IETF), Request for Comments: 6749, Oct. 2012, 76 pages.

Seitz, L. et al., "Authorization Framework for the Internet-of-Things", IEEE 14th International Symposium on a World of Wireless, Mobile and Multimedia Networks (WOWMOM), Jun. 4, 2013, 6 pages.

Seitz, L. et al., "Design Considerations for Security Protocols in Constrained Environments Draft-Seitz-Ace-Design-Considerations-00", CoRE Working Group, Internet-Draft, Feb. 14, 2014, 14 pages.

Seitz, L. et al., "Problem Description for Authorization in Constrained Environments Draft-Seitz-Ace-Problem-Description-01", ACE Working Group, Internet-Draft, Jul. 3, 2014, 18 pages.

Seitz, L. et al., "ACE Use Cases Draft-Seitz-Ace-Usecases-02", ACE Working Group, Internet-Draft, Oct. 27, 2014, 24 pages.

Vollbrecht, J. et al., "AAA Authorization Framework", Network Working Group, Request for Comments: 2904, Aug. 2000, 35 pages.

* cited by examiner

RESOURCE ACCESS METHOD AND APPARATUS

CROSS-REFERENCE TO RELATED APPLICATIONS

This application is a continuation of U.S. patent application Ser. No. 16/748,134, filed on Jan. 21, 2020, which is a continuation of U.S. patent application Ser. No. 15/494,638, filed on Apr. 24, 2017, now U.S. Pat. No. 10,587,531, issued Mar. 10, 2020, which is a continuation of International Application No. PCT/CN2014/089466, filed on Oct. 24, 2014. All of the aforementioned applications are hereby incorporated by reference in their entireties.

TECHNICAL FIELD

The present invention relates to the field of communication technologies, and particularly, to a resource access method and apparatus.

BACKGROUND

The Internet of Things (The Internet of Things) is an important part of new generation information technologies. According to the Internet of Things, various types of information about any object that needs to be monitored, connected to, or interacted with, or any process, or the like are collected in real time by using various information sensing devices. A huge network is formed by combining the Internet of Things and the Internet.

Usually, in the Internet of Things, a resource server (RS) includes one or more resource entities. The resource entity may be a sensor such as a humidity sensor, a temperature sensor, a gravity sensor, or various industrial sensors. Alternatively, the resource entity may be a controller such as a light switch, a temperature regulator, or various industrial controllers.

The resource server is a constrained node. Compared with an unconstrained node, the constrained node has a limited central processing unit, limited storage space, a limited battery capacity, a limited data transmission capability, a limited user interface, and the like. The constrained node usually refers to a sensor, a controller, an intelligent object, an intelligent device, and the like. A storage capacity of a RAM (Random Access Memory) in the constrained node is less than or equal to 50 kilobytes. A storage capacity of a ROM (Read Only Memory) in a constrained node is less than or equal to 250 kilobytes. A network including constrained nodes is usually referred to as a constrained network. Such a network usually has an unstable transmission channel, limited and unpredictable bandwidth, and an unstable network topology.

In an actual application, a client needs to access a resource entity on the resource server, to obtain a related resource. However, because the resource server may include private data, for example, in a health and medical scenario, there may be information about a user such as a blood pressure and a heart rate on a sensor. To improve data security, the client needs to obtain permission to access the resource server before obtaining the private data from the resource server. Therefore, authorizing the client in the Internet of Things is particularly important.

In an actual application, an authorization server is generally located in a home domain of the resource server, and is an unconstrained node. The unconstrained node refers to a device having features such as a strong processing capability, large storage space, a large battery capacity, a strong transmission capability, and diversified user interfaces compared with a constrained node. A storage capacity of a RAM in a constrained node is greater than 50 kilobytes, and a storage capacity of a ROM in the unauthorized node is greater than 250 kilobytes. The authorization server assists the resource server in performing permission authentication and authorization control on the client on behalf of a resource owner. Main functions of the authorization server include one or more of the followings: (1) obtaining authorization information of the resource server from the resource owner, that is, which client has which access permission for which resource server in what condition; (2) assisting the resource server in establishing a secure data transmission channel between the client and the resource server, that is, negotiating a session key or providing authentication information; (3) returning authorization information for different clients and different resource information on different resource servers according to a request of the client or the resource server; and (4) storing an authorization rule that is set by the resource owner, and performing authorization verification on an authorization request from the client or the resource server according to the authorization rule.

In the prior art, a process in which a client accesses a resource is as follows.

Step S1: The client sends a resource access request to a resource server.

Step S2: The resource server returns address information of an authorization server to the client.

Step S3: The client sends an authorization request to the authorization server according to the address information of the authorization server.

Step S4: The authorization server returns an authorization response to the client.

The authorization response may be an authorization verification success response or an authorization verification failure response. The authorization verification success response carries an authorization verification credential used to indicate a verification result. If the authorization response is the authorization verification success response, step S5 further needs to be performed.

Step S5: The client sends a resource access request to the resource server.

The resource access request carries the authorization verification credential.

Step S6: The resource server returns a resource access response to the client according to the authorization verification credential.

During the foregoing authorization on the client, direct interaction between the client and the authorization server is implemented when the client can communicate with the authorization server. However, in an actual application, when the client cannot directly communicate with the authorization server, for example, when the client is disconnected from the authorization server, the authorization on the client cannot be implemented. As a result, the client cannot obtain a resource from the resource server.

SUMMARY

Embodiments of the present invention provide a resource access method and apparatus, to resolve a current disadvantage that a client cannot access a resource when the client cannot communicate with an authorization server.

According to a first aspect, a resource access method is provided, applied to an Internet of Things scenario, including: sending an authorization request to an authorization server; after determining that an authorization response returned by the authorization server is not received, sending a resource access request to a resource server, where the resource access request carries first instruction information that is used to instruct the resource server to send the authorization request to the authorization server; and receiving a resource access response returned by the resource server, where the resource access response is returned according to the resource access request after the resource server sends the authorization request to the authorization server according to the first instruction information and receives the authorization response sent by the authorization server.

With reference to the first aspect, in a first possible implementation manner, before the sending an authorization request to an authorization server, the method further includes: sending an authorization server address obtaining request to a resource directory server, where the authorization server address obtaining request carries identifier information of the resource server corresponding to the authorization server; and receiving address information of the authorization server that is returned by the resource directory server, where the sending an authorization request to an authorization server specifically includes: sending the authorization request to the authorization server according to the address information.

With reference to the first aspect or the first possible implementation manner of the first aspect, in a second possible implementation manner, the receiving a resource access response returned by the resource server specifically includes: receiving an authorization verification failure response returned by the resource server, where the authorization verification failure response carries one or any combination of information that the client does not have permission, information that permission owned by the client does not accord with permission requested by the client, or information that a local condition of a request of the client for the resource does not meet a preset rule.

According to a second aspect, a resource access method is provided, applied to an Internet of Things scenario, including: receiving a resource access request that is sent by a client after the client fails to receive an authorization response returned by an authorization server, where the resource access request carries first instruction information that is used to instruct the resource server to send an authorization request to the authorization server; sending the authorization request to the authorization server according to the first instruction information; receiving the authorization response returned by the authorization server; and returning a resource access response to the client according to the authorization response.

With reference to the second aspect, in a first possible implementation manner, the returning a resource access response to the client according to the authorization response specifically includes: returning an authorization verification failure response to the client according to the authorization response, where the authorization verification failure response carries one or any combination of information that the client does not have permission, information that permission owned by the client does not accord with permission requested by the client, or information that a local condition of a request of the client for the resource does not meet a preset rule.

According to a third aspect, a resource access method is provided, applied to an Internet of Things scenario, including: receiving an authorization request that is sent by a client by using a resource server; and sending an authorization response to the resource server according to the authorization request, so that the resource server returns a resource access response to the client according to the authorization response.

According to a fourth aspect, a resource access method is provided, applied to an Internet of Things scenario, including: sending an authorization request to an authorization server, where the authorization request carries instruction information that is used to instruct to obtain an authorization information identifier; receiving the authorization information identifier of the authorization information that is generated by the authorization server according to the instruction information; sending, to a resource server, a resource access request carrying the authorization information identifier; and receiving a resource access response returned by the resource server, where the resource access response is returned after the resource server receives, according to the authorization information identifier, an authorization response sent by the authorization server.

With reference to the fourth aspect, in a first possible implementation manner, before the sending an authorization request to an authorization server, the method further includes: sending an authorization server address obtaining request to a resource directory server, where the authorization server address obtaining request carries identifier information of the resource server corresponding to the authorization server; and receiving address information of the authorization server that is returned by the resource directory server, where the sending an authorization request to an authorization server specifically includes: sending the authorization request to the authorization server according to the address information.

With reference to the fourth aspect or the first possible implementation manner of the fourth aspect, in a second possible implementation manner, after the sending, to a resource server, a resource access request carrying the authorization information identifier, the method further includes: receiving an authorization verification failure response returned by the resource server, where the authorization verification failure response carries one or any combination of information that the client does not have permission, information that permission owned by the client does not accord with permission requested by the client, or information that a local condition of a request of the client for the resource does not meet a preset rule.

According to a fifth aspect, a resource access method is provided, applied to an Internet of Things scenario, including: receiving a resource access request that carries the authorization information identifier and that is sent by a client, where the authorization information identifier is generated by an authorization server according to instruction information that is used to instruct to obtain the authorization information identifier and that is sent by the client; receiving, according to the authorization information identifier, an authorization response sent by the authorization server; and returning a resource access response to the client according to the authorization response.

With reference to the fifth aspect, in a first possible implementation manner, the receiving, according to the authorization information identifier, an authorization response sent by the authorization server specifically includes: parsing the authorization information identifier, to obtain digital signature information; after the digital signature information is successfully verified, sending, to the authorization server, an authorization request carrying an access token identifier; and receiving the authorization response that is returned by the authorization server according to the access token identifier.

With reference to the fifth aspect or the first possible implementation manner of the fifth aspect, in a second possible implementation manner, the returning a resource access response to the client according to the authorization response specifically includes: returning an authorization verification failure response to the client according to the authorization response, where the authorization verification failure response carries one or any combination of information that the client does not have permission, information that permission supported by the client does not accord with permission requested by the client, or information that a local condition of a request of the client for the resource does not meet a preset rule.

According to a sixth aspect, a resource access method is provided, applied to an Internet of Things scenario, including: receiving an authorization request sent by a client, where the authorization request carries instruction information that is of the client and that is used to instruct to obtain an authorization information identifier; generating the authorization information identifier of authorization information according to the instruction information; sending the authorization information identifier to the client; receiving an authorization request sent by the resource server, where the authorization request carries the authorization information identifier; and returning an authorization response to the resource server according to the authorization information identifier.

According to a seventh aspect, a resource access method is provided, applied to an Internet of Things scenario, including: sending an authorization request to an authorization server, where the authorization request carries instruction information that is used to instruct the authorization server to send authorization information to a resource server; receiving an authorization feedback response that is sent by the authorization server after the authorization server sends the authorization information to the resource server; sending a resource access request to the resource server according to the authorization feedback response, where the resource access request carries identification information identifying that the authorization server has sent the authorization information to the resource server; and receiving a resource access response returned by the resource server, where the resource access response is returned according to the authorization information after the resource server obtains, according to the identification information, the authorization information sent by the authorization server.

With reference to the seventh aspect, in a first possible implementation manner, before the sending an authorization request to an authorization server, the method further includes: sending an authorization server address obtaining request to a resource directory server, where the authorization server address obtaining request carries identifier information of the resource server corresponding to the authorization server; and receiving address information of the authorization server that is returned by the resource directory server, where the sending an authorization request to an authorization server specifically includes: sending the authorization request to the authorization server according to the address information.

With reference to the seventh aspect or the first possible implementation manner of the seventh aspect, in a second possible implementation manner, the receiving a resource access response returned by the resource server specifically includes: receiving an authorization verification failure response returned by the resource server, where the authorization verification failure response carries one or any combination of information that the client does not have permission, information that permission owned by the client does not accord with permission requested by the client, or information that a local condition of a request of the client for the resource does not meet a preset rule.

According to an eighth aspect, a resource access method is provided, applied to an Internet of Things scenario, including: receiving authorization information sent by an authorization server, where the authorization information is sent by the authorization server according to instruction information that is carried in an authorization request sent by a client, and the instruction information is used to instruct the authorization server to send the authorization information to a resource server; receiving a resource access request sent by the client, where the resource access request carries identification information identifying that the authorization server has sent the authorization information to the resource server; and returning a resource access response to the client, where the resource access response is returned according to the authorization information after the authorization information sent by the authorization server is obtained according to the identification information.

With reference to the eighth aspect, in a first possible implementation manner, the returning a resource access response to the client specifically includes: returning an authorization verification failure response to the client, where the authorization verification failure response carries one or any combination of information that the client does not have permission, information that permission owned by the client does not accord with permission requested by the client, or information that a local condition of a request of the client for the resource does not meet a preset rule.

According to a ninth aspect, a resource access method is provided, applied to an Internet of Things scenario, including: receiving an authorization request sent by a client, where the authorization request carries instruction information that is used to instruct an authorization server to send authorization information to a resource server; and sending the authorization information to the resource server according to the instruction information, so that the resource server returns a resource access response to the client according to the authorization information.

According to a tenth aspect, a resource access method is provided, applied to an Internet of Things scenario, including: sending a resource access request to an authorization server; and receiving a resource access response returned by the authorization server, where the resource access response is sent by a resource server to the authorization server after the authorization server successfully verifies the resource access response and sends the resource access response to the resource server and after the resource server successfully verifies the resource access request and sends the resource access request to the authorization server.

With reference to the tenth aspect, in a first possible implementation manner, before the sending a resource access request to an authorization server, the method further includes: sending an authorization server address obtaining request to a resource directory server, where the authorization server address obtaining request carries identifier information of the resource server corresponding to the authorization server; and receiving address information of the authorization server that is returned by the resource directory server, where the sending a resource access request to an authorization server specifically includes: sending the resource access request to the authorization server according to the address information.

According to an eleventh aspect, a resource access method is provided, applied to an Internet of Things scenario, including: receiving a resource access request that carries authorization information and that is sent by an authorization server, where the resource access request is sent after the authorization server successfully verifies the resource access request sent by a client; verifying the authorization information, and generating a resource access response; and returning the resource access response to the client by using the authorization server.

With reference to the eleventh aspect, in a first possible implementation manner, the verifying the authorization information, and generating a resource access response specifically includes: verifying the authorization information, and generating an authorization verification failure response, where the authorization verification failure response carries one or any combination of information that the client does not have permission, information that permission supported by the client does not accord with permission requested by the client, or information that a local condition of a request of the client for the resource does not meet a preset rule.

According to a twelfth aspect, a resource access method is provided, applied to an Internet of Things scenario, including: receiving a resource access request sent by a client; generating authorization information after the resource access request is successfully verified; adding the authorization information to the resource access request, and sending the resource access request to a resource server; and receiving a resource access response returned by the resource server, and sending the resource access response to the client.

With reference to the twelfth aspect, in a first possible implementation manner, the receiving a resource access response returned by the resource server specifically includes: receiving an authorization verification failure response returned by the resource server; and sending the authorization verification failure response to the client, where the authorization verification failure response carries one or any combination of information that the client does not have permission, information that permission owned by the client does not accord with permission requested by the client, or information that a local condition of a request of the client for the resource does not meet a preset rule.

According to a thirteenth aspect, a client is provided, applied to an Internet of Things scenario, including: a transmitter, configured to send an authorization request to an authorization server, where the transmitter is further configured to: after determining that an authorization response returned by the authorization server is not received, send a resource access request to a resource server, where the resource access request carries first instruction information that is used to instruct the resource server to send the authorization request to the authorization server; and a receiver, configured to receive a resource access response returned by the resource server, where the resource access response is returned according to the resource access request after the resource server sends the authorization request to the authorization server according to the first instruction information and receives the authorization response sent by the authorization server.

With reference to the thirteenth aspect, in a first possible implementation manner, the transmitter is further configured to: send an authorization server address obtaining request to a resource directory server, where the authorization server address obtaining request carries identifier information of the resource server corresponding to the authorization server; and the receiver is further configured to receive address information of the authorization server that is returned by the resource directory server, where when sending the authorization request to the authorization server, the transmitter is specifically configured to: send the authorization request to the authorization server according to the address information.

According to a fourteenth aspect, a resource server is provided, applied to an Internet of Things scenario, including: a receiver, configured to receive a resource access request that is sent by a client after the client fails to receive an authorization response returned by an authorization server, where the resource access request carries first instruction information that is used to instruct the resource server to send an authorization request to the authorization server; and a transmitter, configured to send the authorization request to the authorization server according to the first instruction information, where the receiver is further configured to receive the authorization response returned by the authorization server; and the transmitter is further configured to return a resource access response to the client according to the authorization response.

According to a fifteenth aspect, an authorization server is provided, applied to an Internet of Things scenario, including: a receiver, configured to receive an authorization request that is sent by a client by using a resource server; and a transmitter, configured to send an authorization response to the resource server according to the authorization request, so that the resource server returns a resource access response to the client according to the authorization response.

According to a sixteenth aspect, a client is provided, applied to an Internet of Things scenario, including: a transmitter, configured to send an authorization request to an authorization server, where the authorization request carries instruction information that is used to instruct to obtain an authorization information identifier; and a receiver, configured to receive the authorization information identifier of the authorization information that is generated by the authorization server according to the instruction information, where the transmitter is further configured to send, to a resource server, a resource access request carrying the authorization information identifier; and the receiver is further configured to receive a resource access response returned by the resource server, where the resource access response is returned after the resource server receives, according to the authorization information identifier, an authorization response sent by the authorization server.

With reference to the sixteenth aspect, in a first possible implementation manner, the transmitter is further configured to: send an authorization server address obtaining request to a resource directory server, where the authorization server address obtaining request carries identifier information of the resource server corresponding to the authorization server; and the receiver is further configured to receive address information of the authorization server that is returned by the resource directory server, where when sending the authorization request to the authorization server, the transmitter is specifically configured to: send the authorization request to the authorization server according to the address information.

According to a seventeenth aspect, a resource server is provided, applied to an Internet of Things scenario, including: a receiver, configured to receive a resource access request that carries the authorization information identifier and that is sent by a client, where the authorization information identifier is generated by an authorization server according to instruction information that is used to instruct to obtain the authorization information identifier and that is sent by the client; and a transmitter, configured to receive, according to the authorization information identifier, an authorization response sent by the authorization server, where the transmitter is further configured to return a resource access response to the client according to the authorization response.

With reference to the seventeenth aspect, in a first possible implementation manner, the resource server further includes a processor, where the processor is configured to: parse the authorization information identifier, to obtain digital signature information, where after the digital signature information is successfully verified, the transmitter is further configured to send, to the authorization server, an authorization request carrying an access token identifier; and the receiver is further configured to receive the authorization response that is returned by the authorization server according to the access token identifier.

According to an eighteenth aspect, an authorization server is provided, applied to an Internet of Things scenario, including: a receiver, configured to receive an authorization request sent by a client, where the authorization request carries instruction information that is of the client and that is used to instruct to obtain an authorization information identifier; a processor, configured to generate the authorization information identifier of authorization information according to the instruction information; and a transmitter, configured to send the authorization information identifier to the client, where the receiver is further configured to receive an authorization request sent by the resource server, where the authorization request carries the authorization information identifier; and the transmitter is further configured to return an authorization response to the resource server according to the authorization information identifier.

According to a nineteenth aspect, a client is provided, applied to an Internet of Things scenario, including: a transmitter, configured to send an authorization request to an authorization server, where the authorization request carries instruction information that is used to instruct the authorization server to send authorization information to a resource server; and a receiver, configured to receive an authorization feedback response that is sent by the authorization server after the authorization server sends the authorization information to the resource server, where the transmitter is further configured to send a resource access request to the resource server according to the authorization feedback response, where the resource access request carries identification information identifying that the authorization server has sent the authorization information to the resource server; and the receiver is further configured to receive a resource access response returned by the resource server, where the resource access response is returned according to the authorization information after the resource server obtains, according to the identification information, the authorization information sent by the authorization server.

With reference to the nineteenth aspect, in a first possible implementation manner, the transmitter is further configured to: send an authorization server address obtaining request to a resource directory server, where the authorization server address obtaining request carries identifier information of the resource server corresponding to the authorization server; and the receiver is further configured to receive address information of the authorization server that is returned by the resource directory server, where when sending the authorization request to the authorization server, the transmitter is specifically configured to: send the authorization request to the authorization server according to the address information.

According to a twentieth aspect, a resource server is provided, applied to an Internet of Things scenario, including: a receiver, configured to receive authorization information sent by an authorization server, where the authorization information is sent by the authorization server according to instruction information that is carried in an authorization request sent by a client, and the instruction information is used to instruct the authorization server to send the authorization information to a resource server, where the receiver is further configured to receive a resource access request sent by the client, where the resource access request carries identification information identifying that the authorization server has sent the authorization information to the resource server; and a transmitter, configured to return a resource access response to the client, where the resource access response is returned according to the authorization information after the authorization information sent by the authorization server is obtained according to the identification information.

According to a twenty-first aspect, an authorization server is provided, applied to an Internet of Things scenario, including: a receiver, configured to receive an authorization request sent by a client, where the authorization request carries instruction information that is used to instruct the authorization server to send authorization information to a resource server; and a transmitter, configured to send the authorization information to the resource server according to the instruction information, so that the resource server returns a resource access response to the client according to the authorization information.

According to a twenty-second aspect, a client is provided, applied to an Internet of Things scenario, including: a transmitter, configured to send a resource access request to an authorization server; and a receiver, configured to receive a resource access response returned by the authorization server, where the resource access response is sent by a resource server to the authorization server after the authorization server successfully verifies the resource access response and sends the resource access response to the resource server and after the resource server successfully verifies the resource access request and sends the resource access request to the authorization server.

With reference to the twenty-second aspect, in a first possible implementation manner, the transmitter is further configured to: send an authorization server address obtaining request to a resource directory server, where the authorization server address obtaining request carries identifier information of the resource server corresponding to the authorization server; and the receiver is further configured to receive address information of the authorization server that is returned by the resource directory server, where when sending the resource access request to the authorization server, the transmitter is specifically configured to: send the resource access request to the authorization server according to the address information.

According to a twenty-third aspect, a resource server is provided, applied to an Internet of Things scenario, including: a receiver, configured to receive a resource access request that carries authorization information and that is sent by an authorization server, where the resource access request is sent after the authorization server successfully verifies the resource access request sent by a client; a processor, configured to verify the authorization information, and generate a resource access response; and a transmitter, configured to return the resource access response to the client by using the authorization server.

According to a twenty-fourth aspect, an authorization server is provided, applied to an Internet of Things scenario, including: a receiver, configured to receive a resource access request sent by a client; a processor, configured to generate authorization information after the resource access request is successfully verified; and a transmitter, configured to add the authorization information to the resource access request, and send the resource access request to a resource server, where the receiver is further configured to receive a resource access response returned by the resource server, and send the resource access response to the client.

To resolve a current problem that a client cannot access a resource when the client cannot directly communicate with an authorization server, the embodiments of the present invention provide a resource access method. In the solution, an authorization request is sent to an authorization server. After it is determined that an authorization response returned by the authorization server is not received, a resource access request is sent to a resource server. The resource access request carries first instruction information that is used to instruct the resource server to send the authorization request to the authorization server. A resource access response returned by the resource server is received. The resource access response is returned according to the resource access request after the resource server sends the authorization request to the authorization server according to the first instruction information and receives the authorization response sent by the authorization server. In this way, even if the client cannot directly communicate with the authorization server, the client can still initiate authorization verification to the authorization server by using the resource server. Then, the resource server returns the resource access response to the client when receiving the authorization response returned by the authorization server. This resolves a current disadvantage that the client cannot access the resource.

DETAILED DESCRIPTION OF ILLUSTRATIVE EMBODIMENTS

Figure 1A:
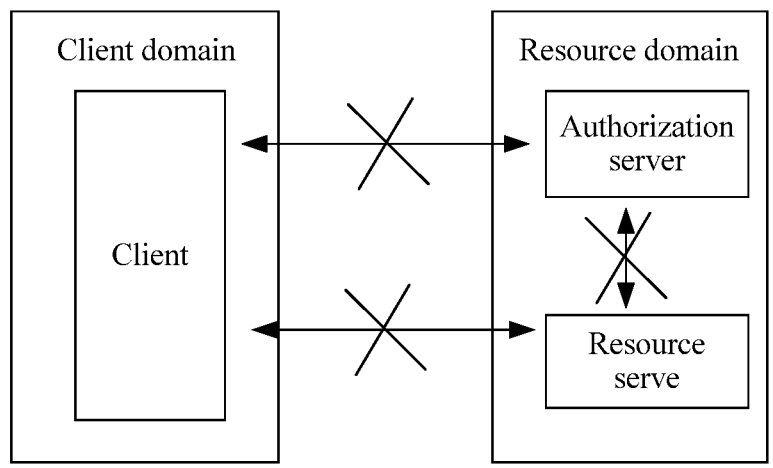
FIG. 1A is a schematic diagram of a disconnected state in the prior art.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/"

in this specification generally indicates an "or" relationship between the associated objects.

In the following, implementation manners of the present invention are described in detail with reference to the accompanying drawings. It should be understood that the preferred embodiments described herein are merely intended to illustrate and explain the present invention, but are not intended to limit the present invention. In addition, the embodiments of the present application and features in the embodiments may be mutually combined if they do not conflict with each other.

An authentication manager is located in a home domain of a client, and is an unconstrained node. The authentication manager assists the client in performing authentication and authorization functions on behalf of a client owner. The authentication manager is a logical entity, and may be integrated with the client or integrated with an authorization server. If the client is an unconstrained node, the authentication manager may be integrated inside the client. If the client is a constrained node, the authentication manager may exist independently, or be located inside the authorization server. Main functions of the authentication manager include one or more of the followings: (1) assisting the client in establishing a secure data transmission channel between the client and a resource server and a secure data transmission channel between the client and the authorization server, that is, negotiating a session key or providing authentication information; and (2) sending an authorization request to the authorization server and receiving an authorization response on behalf of the client.

An RDS (Resource Directory Server) is configured to store directory information of a resource server. The directory information includes attribute information of all resource servers in one home domain, includes information such as an address, an identifier, and a port number of an authorization server corresponding to a resource server, and further includes attribute information of a resource on the resource server. The resource directory server supports a resource query operation of the client and a resource discovery operation of the client, and also supports operations of the resource server such as resource registration, resource update, and resource deletion.

In an actual application, in an Internet of Things application, any two nodes may be disconnected from each other. As shown in FIG. 1A, in a first case, a client is disconnected from an authorization server; in a second case, the authorization server is disconnected from a resource server; in a third case, the client is disconnected from the resource server.

The following describes implementation manners of the present invention in detail with reference to the accompanying drawings.

Figure 1B:
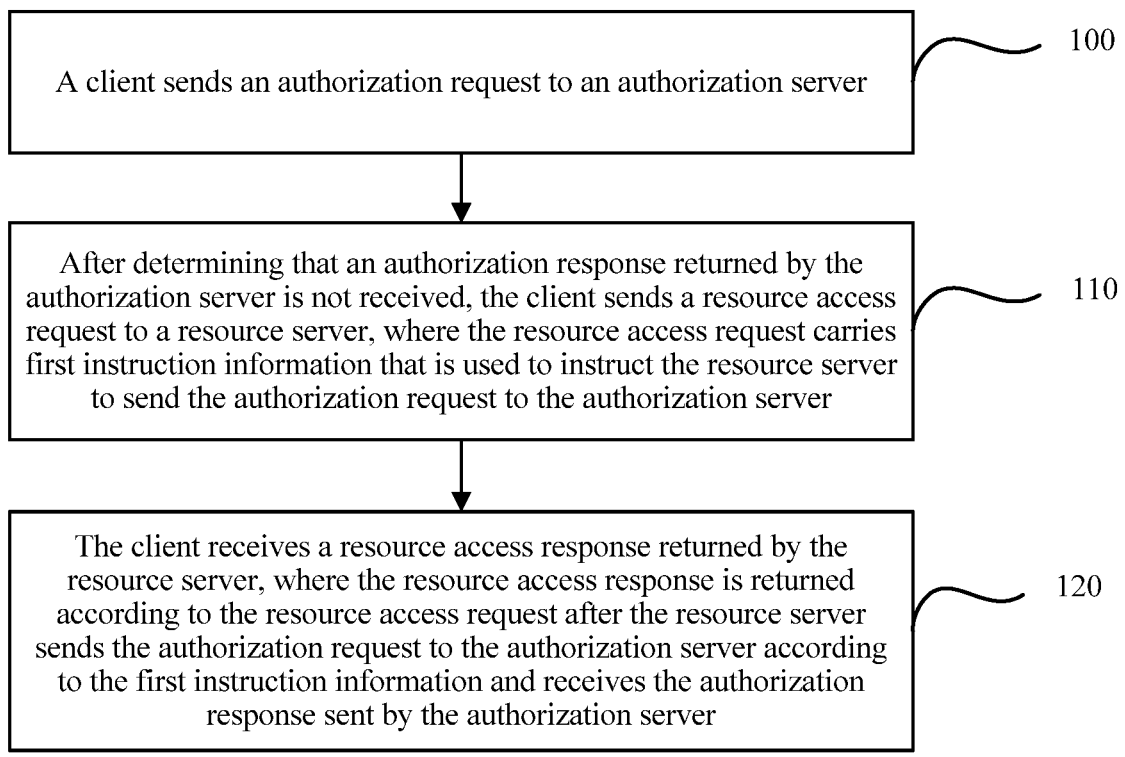
FIG. 1B is a flowchart of resource access according to an embodiment of the present invention.

Referring to FIG. 1B, in an embodiment of the present invention, a resource access process, applied to an Internet of Things scenario, is as follows:

Step 100: A client sends an authorization request to an authorization server.

Step 110: After determining that an authorization response returned by the authorization server is not received, the client sends a resource access request to a resource server, where the resource access request carries first instruction information that is used to instruct the resource server to send the authorization request to the authorization server.

Step 120: The client receives a resource access response returned by the resource server, where the resource access response is returned according to the resource access request after the resource server sends the authorization request to the authorization server according to the first instruction information and receives the authorization response sent by the authorization server.

In this embodiment of the present invention, before the authorization request is sent to the authorization server, if there is no address information of the authorization server, generally, the address information of the authorization server further needs to be obtained. Therefore, before the authorization request is sent to the authorization server, the process may further include the following operations: sending an authorization server address obtaining request to a resource directory server, where the authorization server address obtaining request carries identifier information of the resource server corresponding to the authorization server; and receiving address information of the authorization server that is returned by the resource directory server.

For example, the client sends, to the resource directory server, a resource access request: GET coap://www.resourcdirectory.com/.well-known/rd?ep=node1; and the resource directory server returns, to the client, a resource access response: <node1>; rt="auth-request"; title="Request Client Authorization"; anchor="coaps://www.authserver1234.com"

Certainly, the following manner may alternatively be used: sending a resource access request to the resource server, where the resource access request does not include authorization information; and receiving address information of the authorization server that is returned by the resource server.

Certainly, there are other manners of obtaining the address information of the authorization server, and the manners are not described in detail one by one herein.

After the address information of the authorization server is obtained, the authorization request may be sent to the authorization server in the following manner: sending the authorization request to the authorization server according to the address information.

In this embodiment of the present invention, the resource access request may be a resource access request used to retrieve (Get) a resource, update (Put) a resource, create (Post) a resource, or delete (Delete) a resource.

In this embodiment of the present invention, if one of the client and the resource server is a constrained node, the resource access request is sent based on the CoAP (Constrained Application Protocol). If both the client and the resource server are unconstrained nodes, the resource access request is sent based on the HTTP (Hypertext Transfer Protocol).

The CoAP protocol is a binary protocol based on the UDP (User Datagram Protocol), and is applicable to a case in which a client in the Internet of Things sends a resource access request or receives a resource access response.

In this embodiment of the present invention, after the client determines that the authorization response returned by the authorization server is not received, if the resource server is a constrained node, the client may send the resource access request to the resource server based on the CoAP protocol. The resource access request may include one or any combination of the following information: identifier information of the client, address information of the client, address information of the resource server, port number information of the resource server, address information of a resource to be accessed by the client, information about a target operation performed by the client on the resource, or the like.

For example,

Client-ID: ClientIdentifier1234, the identifier information of the client;

Uri-Host: www.resourceserver1234.com, the address information of the resource server;

Uri-Port: 5683, the port number information of the resource server;

Code: Get, an operation requested by the client for the to-be-accessed resource is retrieving a resource; and Uri-Path: light1, the address information of the resource to be accessed by the client.

In this embodiment of the present invention, when the resource access request is transmitted based on the CoAP protocol, the address information of the authorization server is carried in a Payload field, and a keyword AS indicates that the Payload field carries the address information of the authorization server.

For example,

Payload: {AS: "coaps://www.authserver1234.com" }.

In this embodiment of the present invention, when the resource access response is transmitted based on the CoAP protocol, the authorization information is carried in a Content-Format field. A Code field is used to indicate authorization success or authorization failure of the authorization server. For example, a value 4.01 in the Code field indicates authorization failure, and a value 2.01 in the Code field indicates authorization success:

Code: 4.01, unauthorized

Content-Format: application/ace, the authorization information

In this embodiment of the present invention, when the resource access request is transmitted based on the CoAP protocol, an extended Auth-Request-Uri field may be used to indicate the first instruction information. That is, the Auth-Request-Uri field instructs the resource server to request the authorization information from the authorization server, and a value of the Auth-Request-Uri field may be the address information of the authorization server. For example, Auth-Request-Uri: www.authserver1234.com.

In this embodiment of the present invention, the authorization information includes an access token and/or a digital signature, and the access token may include one or any combination of the following information:

Client-ID: identifier information of the client or address information of the client;

Role: a role, which may be an administrator, a visitor, a blacklist, or the like;

Resource-Uri: the address information of the to-be-accessed resource;

Allowed-Operation: information about an allowed operation performed by the client on the to-be-accessed resource, for example, Get information, Post information, Put information, and Delete information;

Local-Condition: a condition of the authorization server (including a time condition, a status condition, a location condition, and the like);

Validity: a validity period, referring to a valid time of the access token, where the resource server temporarily stores the access token in this period of time for use in the validity period, and the validity period may be an absolute time or a relative time; or Signature: a digital signature, used to indicate that the access token is signed by the authorization server.

Figure 2:
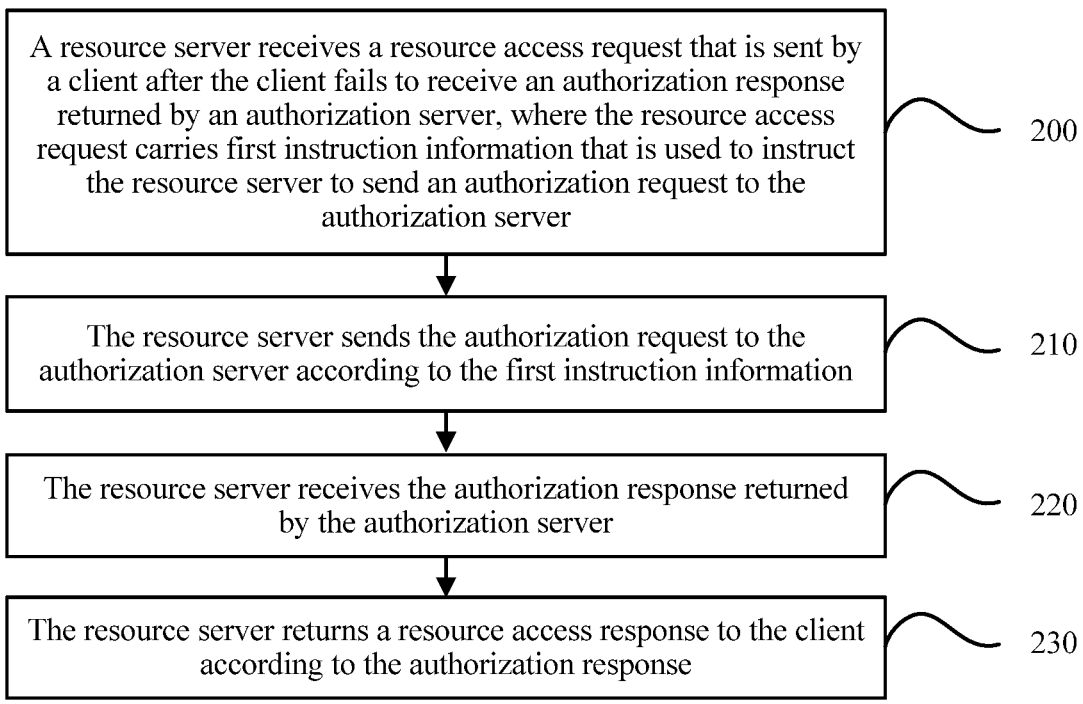
FIG. 2 is another flowchart of resource access according to an embodiment of the present invention.

Referring to FIG. 2, in an embodiment of the present invention, another resource access process, applied to an Internet of Things scenario, is as follows.

Step 200: A resource server receives a resource access request that is sent by a client after the client fails to receive an authorization response returned by an authorization server, where the resource access request carries first instruction information that is used to instruct the resource server to send an authorization request to the authorization server.

Step 210: The resource server sends the authorization request to the authorization server according to the first instruction information.

Step 220: The resource server receives the authorization response returned by the authorization server.

Step 230: The resource server returns a resource access response to the client according to the authorization response.

In this embodiment of the present invention, the authorization request is sent to the authorization server according to the first instruction information. The authorization request may be transmitted based on the CoAP protocol. A keyword Client-Authorize in a Uri-Path field indicates that a function of the authorization request is requesting to obtain authorization information. A Uri-Host field carries address information of the authorization server. A Uri-Port field carries port number information of the authorization server. A Payload field carries information such as identifier information of the client, address information of the client, address information of a resource to be accessed by the client, an operation requested by the client for the to-be-accessed resource, and a time stamp. A Code field carries a Post operation, and the Post operation is used to request the authorization information. In a Content-Format field, application/Auth-Request is used to indicate information carried in the Payload field.

For example,

Uri-Host: www.authserver1234.com, the address information of the authorization server;

Uri-Port: 5683, the port number information of the authorization server;

Code: Post, the authorization request;

Uri-Path: Authorization-Handling, the function of the authorization request is requesting to obtain the authorization information;

Content-Format: application/Auth-Request, which indicates content carried in the Payload field; and Payload: {[Client-ID: "ClientIdentifier1234", Uri-Path: "light1", Operation: "Get", Time-Stamp: 20140902T16:37:00]}.

In this embodiment of the present invention, the time stamp in the authorization request may be used to prevent time inconsistency between the resource server and the authorization server, and help the authorization server learn of time of the resource server.

In this embodiment of the present invention, the authorization request may not carry authentication information of the client. In this case, it is assumed that the authentication information is transmitted by using a DTLS (Datagram Transport Layer Security protocol) message, and the authorization request is transmitted based on a DTLS secure channel, or the authorization request is encrypted by using a key agreed by both parties.

In this embodiment of the present invention, the resource access response returned to the client may be an authorization verification success response, and certainly, may alternatively be an authorization verification failure response. Therefore, in this embodiment of the present invention, there are multiple manners for returning the resource access response to the client according to the authorization response. Optionally, the following manner may be used: returning an authorization verification failure response to the client according to the authorization response, where the authorization verification failure response carries one or any combination of information that the client has no permission, information that permission owned by the client does not accord with permission requested by the client, or information that a local condition of a request of the client for a resource does not meet a preset rule.

Figure 3A:
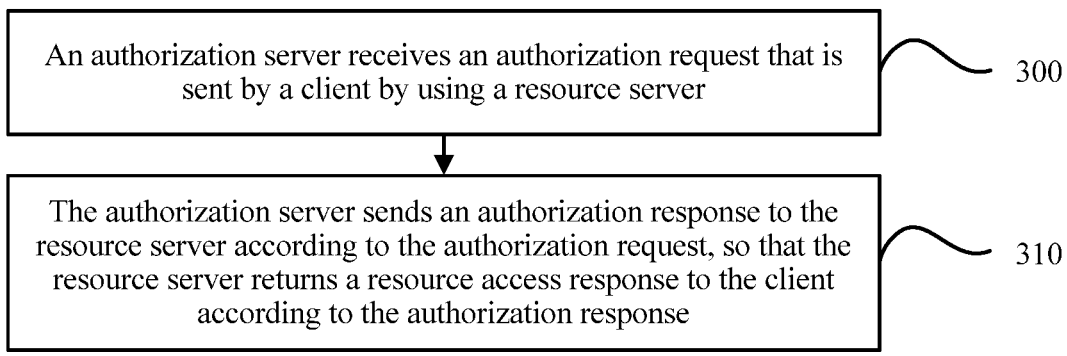
FIG. 3A is another flowchart of resource access according to an embodiment of the present invention.

Referring to FIG. 3A, in an embodiment of the present invention, another resource access process, applied to an Internet of Things scenario, is as follows.

Step 300: An authorization server receives an authorization request that is sent by a client by using a resource server.

Step 310: The authorization server sends an authorization response to the resource server according to the authorization request, so that the resource server returns a resource access response to the client according to the authorization response.

In this embodiment of the present invention, when receiving the authorization request that is sent by the client by using the resource server, the authorization server performs authorization verification on the authorization request according to a pre-configured authorization rule. If verification fails, the authorization server sends an authorization verification failure response to the resource server. If verification succeeds, the authorization server sends an authorization verification success response to the resource server. The authorization verification success response carries an access token.

In this embodiment of the present invention, optionally, the access token includes information for identifying which operation permission the client has on which resource, local condition information of the authorization server, and the like.

In this embodiment of the present invention, because the resource server is a constrained node, the authorization request may be transmitted based on the CoAP protocol. The authorization verification failure response may be indicated by using a value in a Code field. For example, a value 4.01 in the Code field indicates authorization failure, and a value 2.00 in the Code field indicates authorization success.

Further, an access token may be further carried. Optionally, the access token may be carried in a Payload field. In a Content-Format field, application/Access-Token is used to indicate that the Payload field carries information about the access token.

In this embodiment of the present invention, optionally, the access token may alternatively be carried in an extended Access-Token field.

The access token may include one or any combination of the following information:
  Client-ID: identifier information of the client or address information of the client;
  Role: a role, which may be an administrator, a visitor, a blacklist, or the like;
  Resource-Uri: address information of a to-be-accessed resource;
  Allowed-Operation: information about an allowed operation performed by the client on the to-be-accessed resource, for example, Get information, Post information, Put information, and Delete information;
  Local-Condition: a condition of the authorization server (including a time condition, a status condition, a location condition, and the like);
  Validity: a validity period, referring to a valid time of the access token, where the resource server temporarily stores the access token in this period of time for use in the validity period, and the validity period may be an absolute time or a relative time; or
  Signature: signature information, used to indicate that the access token is signed by the authorization server.

For example, an instance of the authorization verification success response returned by the authorization server to the resource server is as follows:
  Uri-Host: www.resourceserver1234.com, address information of the resource server;
  Uri-Port: 5683, port number information of the resource server;
  Code: 2.00, which indicates authorization success; and
  Access-Token: [Client-ID=ClientIdentifier1234, Role=Guest, Resource-Uri=light1, Allowed-Operation=Get & Post & Put, Local-Condition=time>9 am & time<5 pm, Signature=akjkj8767], the access token.

It should be noted that, in a particular condition, the access token may be simplified. For example, the access token includes only information indicating allowed (Yes) or disallowed (No).

In addition, to improve security of the access token, in this embodiment of the present invention, the authorization server may encrypt the access token, and the resource server performs decryption to obtain the access token.

Figure 3B:
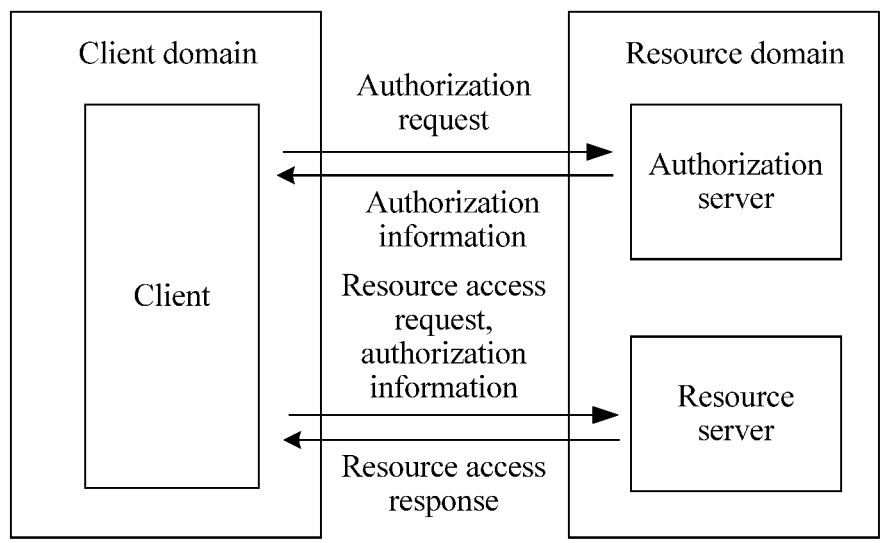
FIG. 3B is a flowchart of resource access in the prior art.

In the prior art, as shown in FIG. 3B, a client obtains authorization information from an authorization server, and then, sends the authorization information to a resource server. Then, after the client sends a resource access request to the resource server, the resource server learns that the client has permission to access the resource server, and then returns a resource access response to the client. However, in an actual application, the client may be incapable of directly communicating with the authorization server. In this case, the client cannot access the resource server.

Figure 3C:
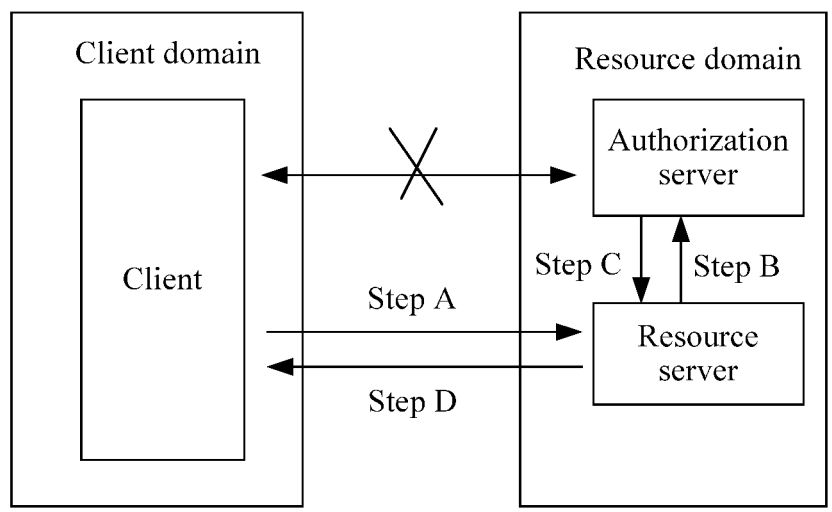
FIG. 3C is another flowchart of resource access according to an embodiment of the present invention.

In this embodiment of the present invention, even if the client cannot directly communicate with the authorization server, the client can still send, to the resource server, the resource access request carrying the first instruction information. The first instruction information is used to instruct the resource server to send the authorization request to the authorization server. Then, the resource server returns the resource access response to the client when receiving the authorization response returned by the authorization server. A schematic diagram of interaction between the client, the authorization server, and the resource server is shown in FIG. 3C.

Step A: The client sends the resource access request to the resource server.

Step B: The resource server sends the authorization request to the authorization server.

Step C: The authorization server returns the authorization response to the resource server.

Step D: The resource server returns the resource access response to the client.

The foregoing implementation process may resolve a current disadvantage that a client cannot access a resource. FIG. 1B, FIG. 2, FIG. 3A are respectively described from perspectives of a client, a resource server, and an authorization server, but effect implementation is not affected.

Figure 4:
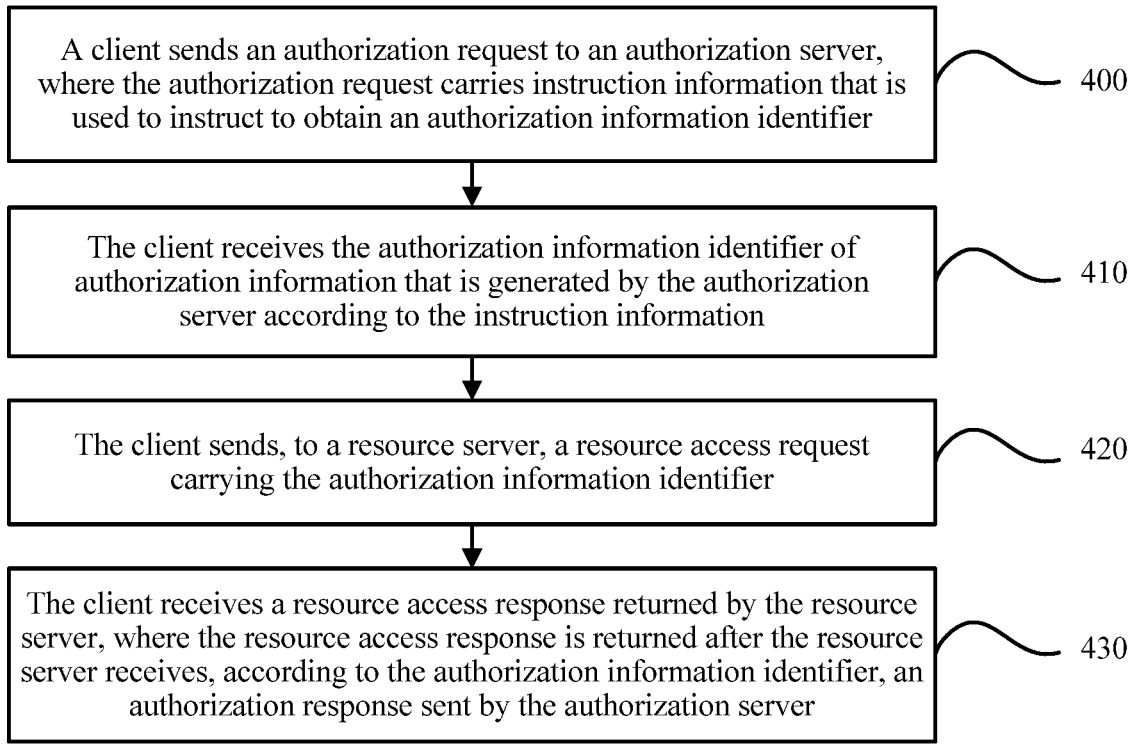
FIG. 4 is another flowchart of resource access according to an embodiment of the present invention.

Referring to FIG. 4, in an embodiment of the present invention, another resource access process, applied to an Internet of Things scenario, is as follows:

Step 400: A client sends an authorization request to an authorization server, where the authorization request carries instruction information that is used to instruct to obtain an authorization information identifier.

Step 410: The client receives the authorization information identifier of authorization information that is generated by the authorization server according to the instruction information.

Step 420: The client sends, to a resource server, a resource access request carrying the authorization information identifier.

Step 430: The client receives a resource access response returned by the resource server, where the resource access response is returned after the resource server receives, according to the authorization information identifier, an authorization response sent by the authorization server.

In this embodiment of the present invention, before the authorization request is sent to the authorization server, the process further includes the following operations: sending an authorization server address obtaining request to a resource directory server, where the authorization server address obtaining request carries identifier information of the resource server corresponding to the authorization server; and receiving address information of the authorization server that is returned by the resource directory server.

Optionally, the authorization request may be sent to the authorization server in the following manner: sending the authorization request to the authorization server according to the address information.

In this embodiment of the present invention, if the client is an unconstrained node, the authorization request may be transmitted based on the HTTP protocol. If the client is a constrained node, the authorization request may be transmitted based on the CoAP protocol.

If the authorization request is transmitted based on the CoAP protocol, a Post operation in a Code field in the authorization request is used to indicate a request for the authorization information. A Uri-Host field and a Uri-Port field are used to respectively carry the address information of the authorization server and port number information of the authorization server. A keyword Auth-Info-Uri in a Uri-Path field indicates that the authorization request requests the authorization information identifier. A Payload field carries one or any combination of identifier information of the client, address information of the client, address information of a resource to be accessed by the client, or information about a target operation performed by the client on the to-be-accessed resource. In a Content-Format field, application/Auth-Request is used to indicate content carried in the Payload field.

In this embodiment of the present invention, after receiving the authorization request sent by the client, the authorization server generates the authorization information according to a preset authorization rule, allocates the authorization information identifier to the generated authorization information, and then, sends the allocated authorization information identifier to the client.

In this embodiment of the present invention, optionally, the authorization information identifier may carry an access token identifier and/or a digital signature of the authorization server.

In this embodiment of the present invention, the authorization information identifier may be transmitted based on the CoAP protocol. The authorization information identifier may be carried in a Payload field. In a Content-Format field, application/Auth-Info-Uri is used to indicate content carried in the Payload field, or an extended Auth-Info-Uri field is used to indicate content carried in the Payload field.

Auth-Info-Uri is a structural body, and may include Access-Token-Uri (access token identifier) and Signature (digital signature). For example, Auth-Info-Uri: [Access-Token-Uri: "Access_Token_Uri_example", Signature: "adkljfafk987" ]

In this embodiment of the present invention, when the resource access request carrying the authorization information identifier is sent to the resource server, the resource access request may be transmitted by using the CoAP protocol. In this case, the authorization information identifier may be carried in an extended Auth-Info-Uri field.

Further, the resource access request may carry address information of the resource server, port number information of the resource server, address information of the to-be-accessed resource, and information about an operation requested by the client for the to-be-accessed resource.

In this embodiment of the present invention, after the resource access request carrying the authorization information identifier is sent to the resource server, the process further includes the following operation: receiving an authorization verification failure response returned by the resource server, where the authorization verification failure response carries one or any combination of information that the client has no permission, information that permission owned by the client does not accord with permission requested by the client, or information that a local condition of a request of the client for a resource does not meet a preset rule.

Figure 5:
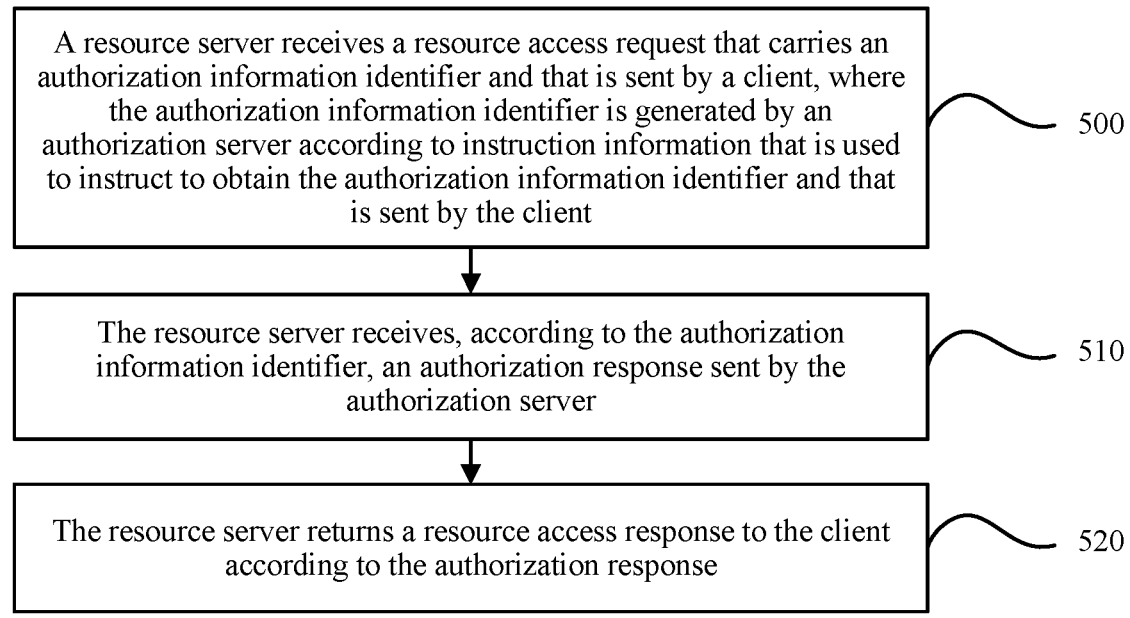
FIG. 5 is another flowchart of resource access according to an embodiment of the present invention.

Referring to FIG. 5, in an embodiment of the present invention, another resource access process, applied to an Internet of Things scenario, is as follows.

Step 500: A resource server receives a resource access request that carries an authorization information identifier and that is sent by a client, where the authorization information identifier is generated by an authorization server according to instruction information that is used to instruct to obtain the authorization information identifier and that is sent by the client.

Step 510: The resource server receives, according to the authorization information identifier, an authorization response sent by the authorization server.

Step 520: The resource server returns a resource access response to the client according to the authorization response.

In this embodiment of the present invention, there are multiple manners for receiving, according to the authorization information identifier, the authorization response sent by the authorization server. Optionally, the following manner may be used: parsing the authorization information identifier, to obtain an access token identifier and a digital signature; after the digital signature is successfully verified, sending, to the authorization server, an authorization request carrying the access token identifier; and receiving the authorization response that is returned by the authorization server according to the access token identifier.

In this embodiment of the present invention, there are multiple manners for returning the resource access response to the client according to the authorization response. Optionally, the following manner may be used: returning an authorization verification failure response to the client according to the authorization response, where the authorization verification failure response carries one or any combination of information that the client has no permission, information that permission supported by the client does not accord with permission requested by the client, or information that a local condition of a request of the client for a resource does not meet a preset rule.

Figure 6:
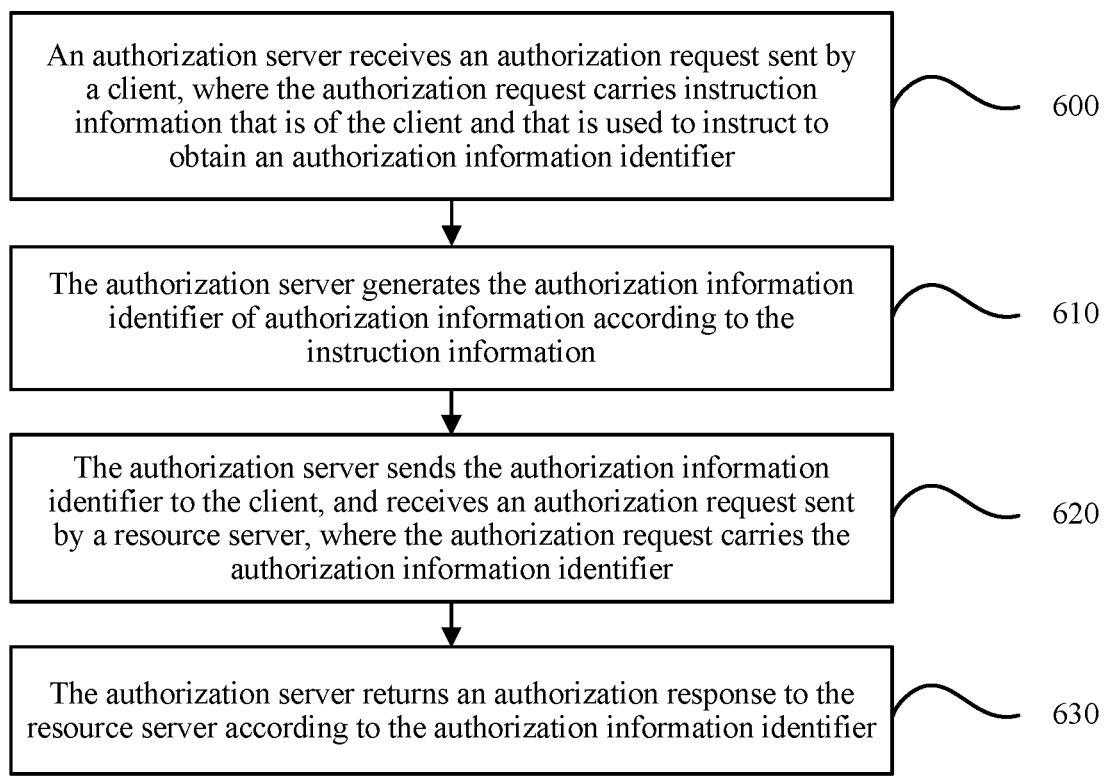
FIG. 6 is another flowchart of resource access according to an embodiment of the present invention.

Referring to FIG. 6, in an embodiment of the present invention, another resource access process, applied to an Internet of Things scenario, is as follows.

Step 600: An authorization server receives an authorization request sent by a client, where the authorization request carries instruction information that is of the client and that is used to instruct to obtain an authorization information identifier.

Step 610: The authorization server generates the authorization information identifier of authorization information according to the instruction information.

Step 620: The authorization server sends the authorization information identifier to the client, and receives an authorization request sent by a resource server, where the authorization request carries the authorization information identifier.

Step 630: The authorization server returns an authorization response to the resource server according to the authorization information identifier.

In the prior art, a client sends an authorization request to an authorization server. The authorization server sends authorization information to the client. Then, the client sends an authorization request to a resource server. Signaling consumption during transmission of the authorization information is greater than that during transmission of an authorization information identifier. Therefore, a current resource access manner has disadvantages of relatively large signaling consumption and relatively serious resource waste. In the resource access solutions provided in the foregoing three embodiments of FIG. 4, FIG. 5, and FIG. 6, an authorization request sent by a client to an authorization server carries instruction information that is of the client and that is used to instruct to obtain an authorization information identifier. The authorization server generates the authorization information identifier of authorization information according to the instruction information, and sends the authorization information identifier to the client. Then, the client sends the authorization information identifier to a resource server. The resource server obtains the authorization information from the authorization server according to the authorization information identifier. Signaling consumption during transmission of the authorization information identifier is less than that during transmission of the authorization information. In this way, according to the solutions provided in the embodiments of the present invention, signaling consumption is reduced, and resource waste is avoided. The foregoing three embodiments of FIG. 4, FIG. 5, and FIG. 6 are respectively described from perspectives of a client, a resource server, and an authorization server, but implementation of the foregoing effects is not affected.

Figure 7:
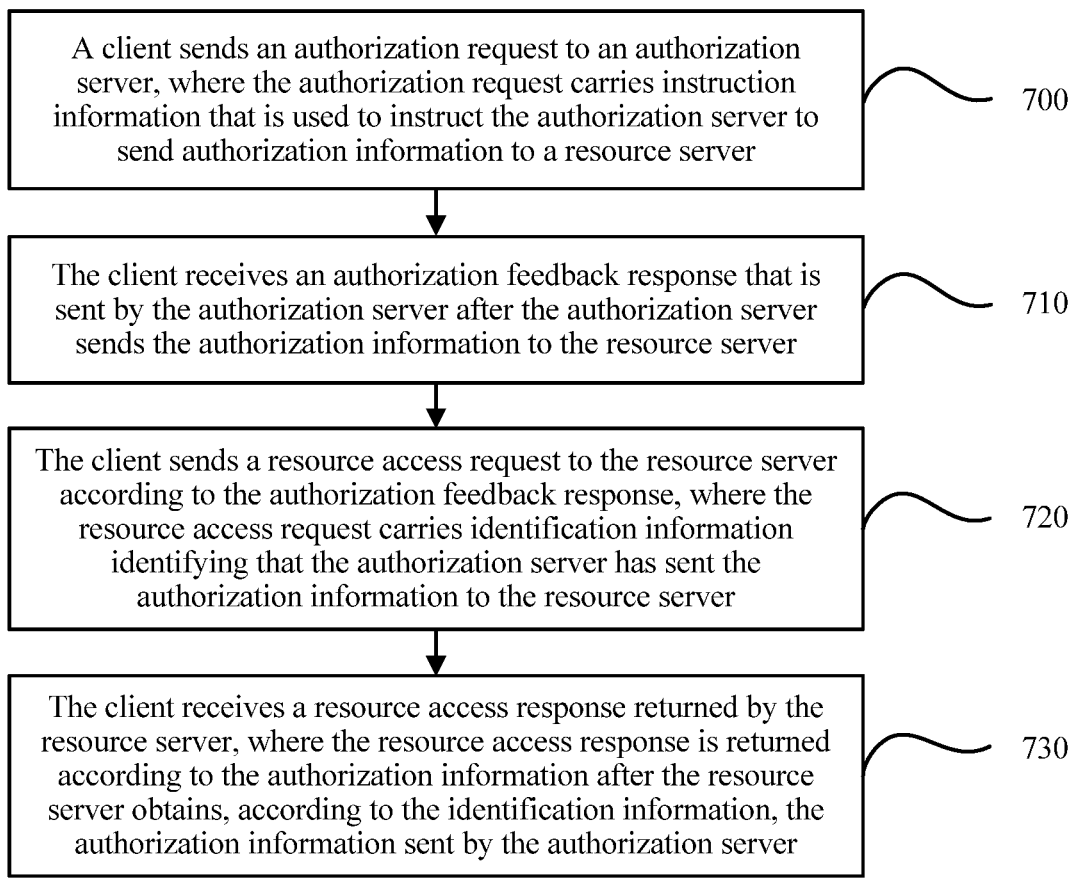
FIG. 7 is another flowchart of resource access according to an embodiment of the present invention.

Referring to FIG. 7, in an embodiment of the present invention, another resource access process, applied to an Internet of Things scenario, is as follows.

Step 700: A client sends an authorization request to an authorization server, where the authorization request carries instruction information that is used to instruct the authorization server to send authorization information to a resource server.

Step 710: The client receives an authorization feedback response that is sent by the authorization server after the authorization server sends the authorization information to the resource server.

Step 720: The client sends a resource access request to the resource server according to the authorization feedback response, where the resource access request carries identification information identifying that the authorization server has sent the authorization information to the resource server.

Step 730: The client receives a resource access response returned by the resource server, where the resource access response is returned according to the authorization information after the resource server obtains, according to the identification information, the authorization information sent by the authorization server.

In this embodiment of the present invention, before the authorization request is sent to the authorization server, the process further includes the following operations: sending an authorization server address obtaining request to a resource directory server, where the authorization server address obtaining request carries identifier information of the resource server corresponding to the authorization server; and receiving address information of the authorization server that is returned by the resource directory server.

In this case, there are multiple manners for sending the authorization request to the authorization server. Optionally, the following manner may be used: sending the authorization request to the authorization server according to the address information.

In this embodiment of the present invention, if the client is an unconstrained node, the resource access request may be transmitted based on the HTTP protocol. If the client is a constrained node, the resource access request is transmitted based on the CoAP protocol preferentially.

When the resource access request is transmitted based on the CoAP protocol preferentially:

A Post operation is used to request the authorization information. A Uri-Host field and a Uri-Port field are used to respectively carry the address information of the authorization server and port number information of the authorization server. An extended Auth-Info-To-RS field is used to carry the identification information identifying that the authorization server sends the authorization information to the resource server, or a keyword "Auth-Info=True" may be used in a Uri-Query field to carry the identification information identifying that the authorization server sends the authorization information to the resource server. A Payload field is used to carry a request in need of authorization, and the request carries identifier information of the client or address information of the client, an address of a resource to be accessed by the client, and an operation requested by the client for the to-be-accessed resource. In a Content-Format field, application/Auth-Request is used to indicate information carried in the Payload field.

In this embodiment of the present invention, there are multiple manners for receiving the resource access response returned by the resource server. Optionally, the following manner may be used: receiving an authorization verification failure response returned by the resource server, where the authorization verification failure response carries one or any combination of information that the client has no permission, information that permission owned by the client does not accord with permission requested by the client, or information that a local condition of a request of the client for a resource does not meet a preset rule.

Figure 8:
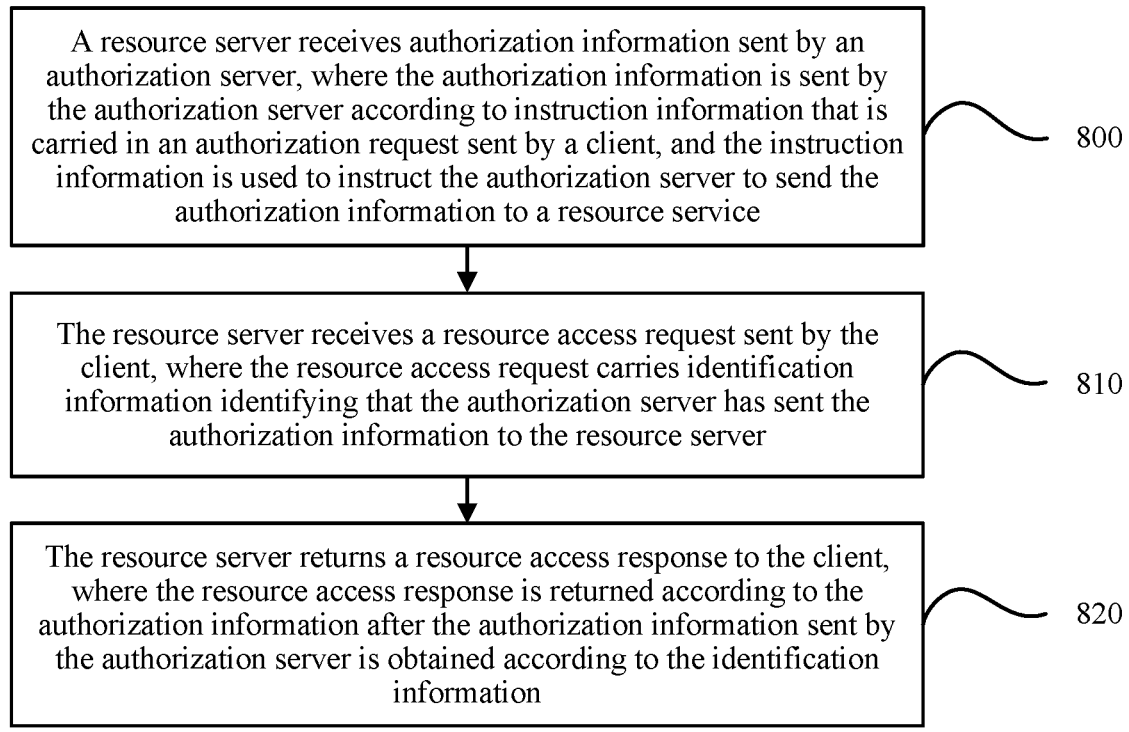
FIG. 8 is another flowchart of resource access according to an embodiment of the present invention.

Referring to FIG. 8, in an embodiment of the present invention, another resource access process, applied to an Internet of Things scenario, is as follows.

Step 800: A resource server receives authorization information sent by an authorization server, where the authorization information is sent by the authorization server according to instruction information that is carried in an authorization request sent by a client, and the instruction information is used to instruct the authorization server to send the authorization information to a resource server.

Step 810: The resource server receives a resource access request sent by the client, where the resource access request carries identification information identifying that the authorization server has sent the authorization information to the resource server.

Step 820: The resource server returns a resource access response to the client, where the resource access response is returned according to the authorization information after the authorization information sent by the authorization server is obtained according to the identification information.

In this embodiment of the present invention, there are multiple manners for returning the resource access response to the client. Optionally, the following manner may be used: returning an authorization verification failure response to the client, where the authorization verification failure response carries one or any combination of information that the client has no permission, information that permission owned by the client does not accord with permission requested by the client, or information that a local condition of a request of the client for a resource does not meet a preset rule.

Figure 9:
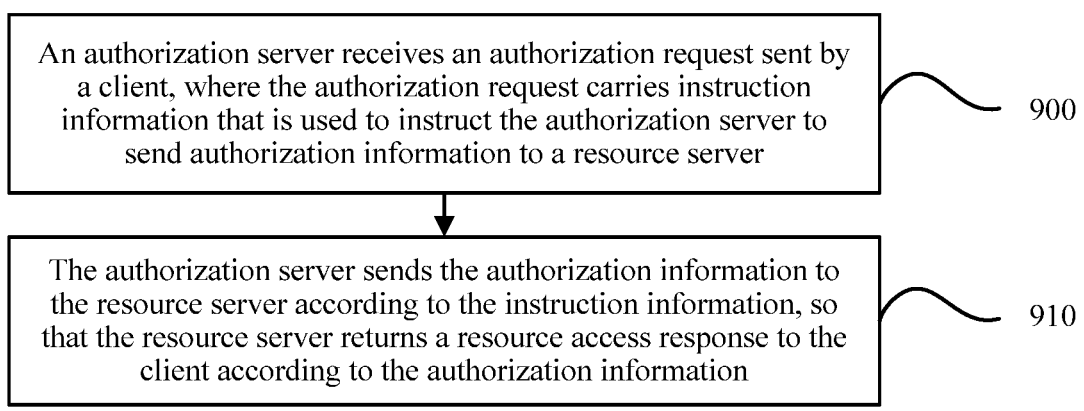
FIG. 9 is another flowchart of resource access according to an embodiment of the present invention.

Referring to FIG. 9, in an embodiment of the present invention, another resource access process, applied to an Internet of Things scenario, is as follows.

Step 900: An authorization server receives an authorization request sent by a client, where the authorization request carries instruction information that is used to instruct the authorization server to send authorization information to a resource server.

Step 910: The authorization server sends the authorization information to the resource server according to the instruction information, so that the resource server returns a resource access response to the client according to the authorization information.

In this embodiment of the present invention, the authorization information includes one or more pieces of information such as an access token, a client identifier, or an address of a resource to be accessed by the client.

When the authorization information is transmitted by using a CoAP message,
- a Post operation is used to deliver the authorization information;
- a Uri-Host field is used to carry address information of the resource server;
- a Uri-Port field is used to carry port number information of the resource server;
- a Uri-Path field is used to carry address information of the resource to be accessed by the client; and
- in a Content-Format field, application/Auth-Info is used to indicate that a message body carries the authorization information.

The authorization information may be carried in the Payload field, and necessarily includes Access-Token and optionally includes the client identifier.

The client identifier and the address of the resource to be accessed by the client are mainly used as indexes of the resource server. When the resource server stores multiple access tokens, and when a request is received from the client, the resource server searches for a corresponding access token according to the client identifier and the address of the resource to be accessed by the client. During implementation, if the message does not explicitly carry the client identifier and the address of the resource to be accessed by the client, the resource server may alternatively extract a corresponding field from the access token, so as to generate an index.

A message instance is as follows:
Code: Post, an authorization information sending request;
Uri-Host: www.resourceserver1234.com, the address information of the resource server;
Uri-Port: 5683, the port number information of the resource server;
Uri-Path: light1, the address information of the resource to be accessed by the client;
Content-Format: application/Auth-Info, which indicates that content of the message body is the authorization information; and
Payload: {Access-Token: [Client-ID=ClientIdentifier1234, Role=Guest, Resource-Uri=light1, Allowed-Operation=Get & Post & Put, Local-Condition=time>9 am & time<5 pm, Signature=akjkj8767]}, the access token.

In this embodiment of the present invention, after the authorization information is sent to the resource server according to the instruction information, the process further includes the following operation: sending an authorization feedback response to the client.

Figure 10:
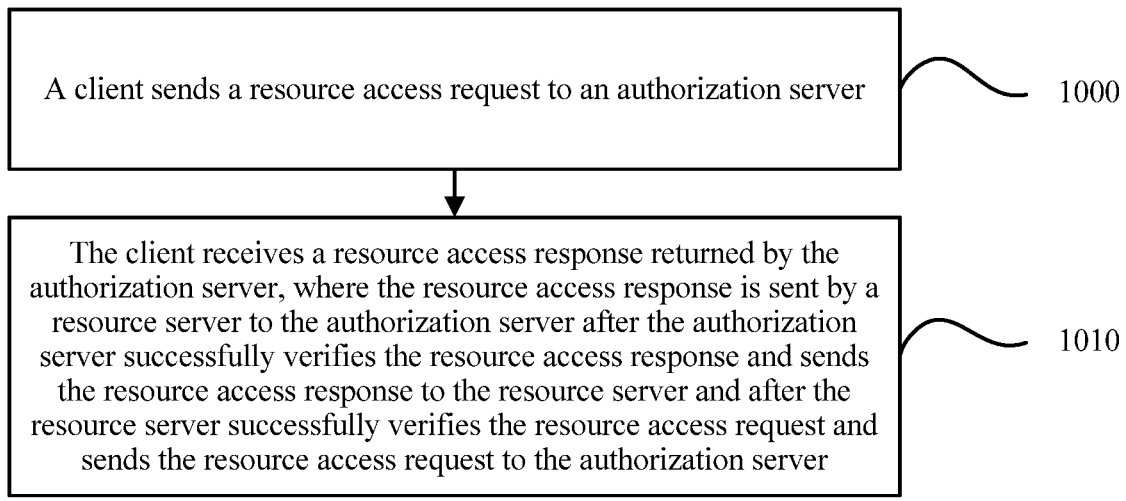
FIG. 10 is another flowchart of resource access according to an embodiment of the present invention.

In the prior art, a client sends an authorization request to an authorization server. The authorization server sends authorization information to the client. Then, the client sends an authorization request to a resource server. Signaling consumption during transmission of the authorization information is greater than that during transmission of an authorization information identifier. Therefore, a current resource access manner has disadvantages of relatively large signaling consumption and relatively serious resource waste. In the resource access solutions provided in the foregoing three embodiments of FIG. 7, FIG. 8, and FIG. 9, an authorization request sent by a client to an authorization server carries instruction information. The instruction information is used by the client to instruct the authorization server to send authorization information to a resource server. In this way, disadvantages caused in a case in which the client obtains the authorization information from the authorization server and then the client sends the authorization information to the resource server are avoided, signaling consumption between the client and the authorization server is reduced, and resource waste is avoided. The foregoing three embodiments of FIG. 7, FIG. 8, and FIG. 9 are respectively described from perspectives of a client, a resource server, and an authorization server, but implementation of the foregoing effects is not affected. Referring to FIG. 10, in an embodiment of the present invention, another resource access process, applied to an Internet of Things scenario, is as follows.

Step 1000: A client sends a resource access request to an authorization server.

Step 1010: The client receives a resource access response returned by the authorization server, where the resource access response is sent by a resource server to the authorization server after the authorization server successfully verifies the resource access response and sends the resource access response to the resource server and after the resource server successfully verifies the resource access request and sends the resource access request to the authorization server.

In this embodiment of the present invention, before the resource access request is sent to the authorization server, the process further includes the following operations: sending an authorization server address obtaining request to a resource directory server, where the authorization server address obtaining request carries identifier information of the resource server corresponding to the authorization server; and receiving address information of the authorization server that is returned by the resource directory server.

Optionally, the resource access request may be sent to the authorization server in the following manner: sending the resource access request to the authorization server according to the address information.

In this embodiment of the present invention, the resource access request includes identifier information of the client, address information of the client, address information of the resource server, address information of a resource to be accessed by the client, information about an operation to be performed by the client on the to-be-accessed resource, address information of the authorization server, time stamp information, and the like.

When the resource access request is transmitted based on the CoAP protocol, the process is specifically as follows: a Source field of the UDP is used to carry an address of the client, and an extended Client-ID field is used to carry a client identifier; a Proxy-Uri field or a newly-extended Auth-URI field is used to carry the address information of the resource server and the address information of the resource to be accessed by the client; a Code field is used to carry a target operation on the resource, for example, Get, Delete, Post, or Put; Uri-Host and Uri-Port are used to carry the address information of the authorization server and port number information of the authorization server; and a Uri-Path field or a Uri-Query field may be used to indicate that the authorization server needs to perform authorization verification on a resource access request, for example, Uri-Query: Auth=true.

A message instance is as follows:
Client-ID: ClientIdentifier1234, the client identifier;
Proxy-Uri: www.resoureserver.com/light1, the address information of the resource to be accessed by the client;
Uri-Host: www.authserver1234.com, the address information of the authorization server;
Uri-Port: 5683, the port number information of the authorization server;
Code: Get, an operation on the target resource: retrieve;
Uri-Query: Auth=true, which indicates a need to authorize a resource request.

It should be noted that this message instance does not carry authentication information of the client. In this embodiment, it is assumed that the authentication information is transmitted by using a DTLS message, and another message is transmitted based on a DTLS secure channel.

If a message transmitted between the client and the authorization server is transmitted by using the HTTP protocol, the message also needs to include the field information described above, but a message format is different.

Figure 11:
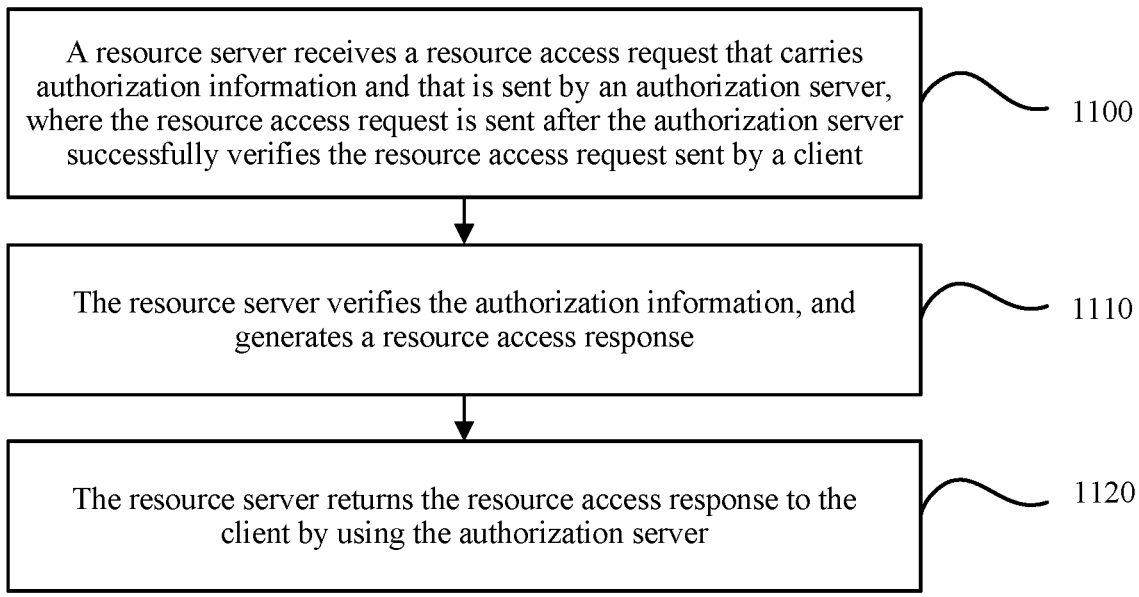
FIG. 11 is another flowchart of resource access according to an embodiment of the present invention.

Referring to FIG. 11, in an embodiment of the present invention, another resource access process, applied to an Internet of Things scenario, is as follows:

Step 1100: A resource server receives a resource access request that carries authorization information and that is sent by an authorization server, where the resource access request is sent after the authorization server successfully verifies the resource access request sent by a client.

Step 1110: The resource server verifies the authorization information, and generates a resource access response.

Step 1120: The resource server returns the resource access response to the client by using the authorization server.

In this embodiment of the present invention, when an authorization verification failure response is transmitted based on the CoAP protocol, the authorization verification failure response may be indicated by using a value in a Code field. For example, a value 4.01 in the Code field indicates authorization failure, and a value 2.00 in the Code field indicates authorization success.

The resource access request and the resource access response may carry a Message-Id field and a Token field. A message identifier carried in the Message-Id field may be used to associate a single resource access request with a single resource access response, and a token carried in the Token field may be used to associate multiple resource access requests with multiple resource access responses. Based on the two fields, the authorization server may associate the resource access request with the resource access response, so as to forward the resource access response to the client.

In this embodiment of the present invention, there are multiple manners for verifying the authorization information and generating the resource access response. Optionally, the following manner may be used: verifying the authorization information, and generating an authorization verification failure response, where the authorization verification failure response carries one or any combination of information that the client has no permission, information that permission supported by the client does not accord with permission requested by the client, or information that a local condition of a request of the client for a resource does not meet a preset rule.

Figure 12:
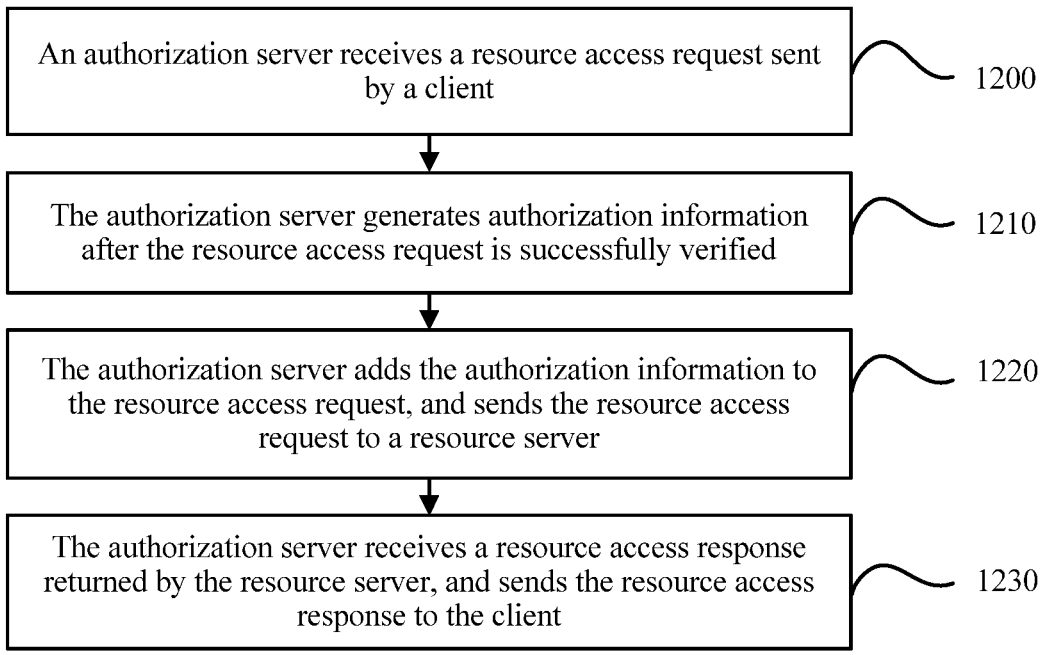
FIG. 12 is another flowchart of resource access according to an embodiment of the present invention.

Referring to FIG. 12, in an embodiment of the present invention, another resource access process, applied to an Internet of Things scenario, is as follows.

Step 1200: An authorization server receives a resource access request sent by a client.

Step 1210: The authorization server generates authorization information after the resource access request is successfully verified.

Step 1220: The authorization server adds the authorization information to the resource access request, and sends the resource access request to a resource server.

Step 1230: The authorization server receives a resource access response returned by the resource server, and sends the resource access response to the client.

In the prior art, a client sends a resource access request to a resource server. The resource server returns a resource access response to the client. However, when the client cannot communicate with the resource server, the client cannot access a resource. In the resource access solutions provided in the foregoing three embodiments of FIG. 10, FIG. 11, and FIG. 12, a client sends a resource access request to an authorization server, the authorization server sends the resource access request to a resource server after the resource access request is successfully verified, and the resource server sends a resource access response to the authorization server after successfully verifying the resource access request. The foregoing three embodiments of FIG. 10, FIG. 11, and FIG. 12 are respectively described from perspectives of a client, a resource server, and an authorization server, but implementation of the foregoing effects is not affected.

In this embodiment of the present invention, the authorization server performs authorization verification on the resource access request according to a preset authorization rule. If verification fails, the authorization server sends an authorization verification failure response to the client. If verification succeeds, the authorization server sends the resource access request to the resource server. The resource access request may carry an access token (Access-Token), identifier information of the client, address information of the resource server, address information of a resource to be accessed by the client, and information about an operation requested by the client for the to-be-accessed resource.

The access token is used to indicate which client has which operation permission on which resource, local condition information, and the like.

Because the resource server is a constrained node, the resource access request is transmitted based on the CoAP protocol preferentially. The access token may be transmitted based on an extended Access-Token field. The access token may include one or any combination of the following information:

Client-ID: the identifier information of the client or address information of the client;
Role: a role, which may be an administrator, a visitor, a blacklist, or the like;
Resource-Uri: the address information of the to-be-accessed resource;
Allowed-Operation: an allowed operation, including Get, Post, Put, Delete, and a combination thereof;
Local-Condition: a condition of the authorization server, including a time condition, a status condition, a location condition, and the like;
Validity: a validity period, a valid time of the access token, where the resource server temporarily stores the access token in this period of time for subsequent use; and
Signature: signature information, used to indicate that the access token is signed by the authorization server.

For example, the resource access request is as follows:
Client-ID: ClientIdentifier1234, the identifier information of the client;
Uri-Host: www.resourceserver.com, the address information of the resource server;
Uri-Port: 5683, port number information of the resource server;
Uri-Path: light1, the address information of the to-be-accessed resource;
Code: Get, an operation on the to-be-accessed resource: retrieve; and
Access-Token: [Client-ID=ClientIdentifier1234, Role=Guest, Resource-Uri=light1, Allowed-Operation=Get & Post & Put, Local-Condition=time>9 am & time<5 pm, Signature=akjkj8767], the access token.

It should be noted that, in a particular condition, the access token may be simplified. For example, the access token includes only information indicating allowed (Yes) or disallowed (No). In addition, a sender may encrypt the access token, and a receiver performs decryption to obtain content.

In this embodiment of the present invention, there are multiple manners for receiving the resource access response returned by the resource server. Optionally, the following manner may be used: receiving an authorization verification failure response returned by the resource server; and sending the authorization verification failure response to the client, where the authorization verification failure response carries one or any combination of information that the client has no permission, information that permission owned by the client does not accord with permission requested by the client, or information that a local condition of a request of the client for a resource does not meet a preset rule.

To protect security of a message transmitted between a client and a resource server, the client and the resource server need to negotiate a key for encryption and decryption of the message transmitted between the client and the resource server. Therefore, the following embodiments are provided.

Figure 13:
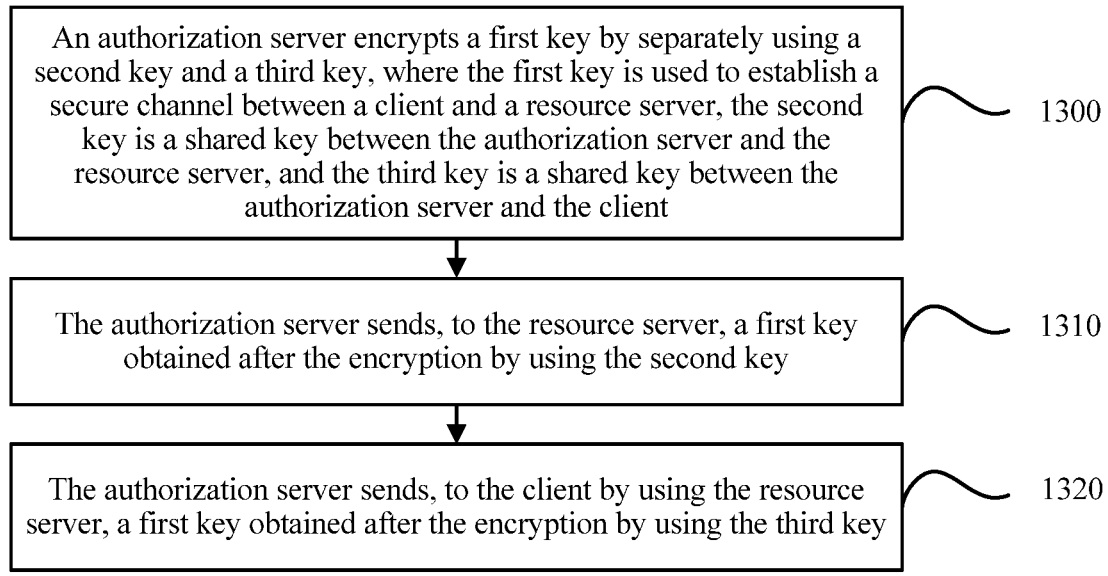
FIG. 13 is a flowchart of key negotiation between a client and a resource server according to an embodiment of the present invention.

Referring to FIG. 13, in an embodiment of the present invention, a process of key negotiation between a client and a resource server, applied to an Internet of Things scenario, is as follows:

Step 1300: An authorization server encrypts a first key by separately using a second key and a third key, where the first key is used to establish a secure channel between a client and a resource server, the second key is a shared key between the authorization server and the resource server, and the third key is a shared key between the authorization server and the client.

Step 1310: The authorization server sends, to the resource server, a first key obtained after the encryption by using the second key.

Step 1320: The authorization server sends, to the client by using the resource server, a first key obtained after the encryption by using the third key.

In this embodiment of the present invention, the first key sent to the resource server is obtained by means of encryption based on the second key and a resource server random number (Nonce_RS), and the first key sent to the client by using the resource server is obtained by means of encryption based on the third key and a client random number (Nonce_C).

The client random number and the resource server random number may change each time.

The two random numbers are transmitted in plaintext. An encryption algorithm is a symmetric algorithm, for example, a DES (Data Encryption Standard) algorithm, a TDEA (Triple Data Encryption Algorithm) algorithm, a Blowfish algorithm, an RC5 algorithm, or an IDEA (International Data Encryption Algorithm) algorithm. Encryption and decryption parties need to agree on an algorithm in advance, and a negotiation process is not described in detail herein.

A key transmitted from/to the resource server may be transferred based on the CoAP protocol. The keys and the random numbers may be carried in message body fields, and may be carried by using data structure fields. For example,
EncryptedRSKey: the first key obtained after the encryption by using the second key;
EncryptedClientKey: the first key obtained after the encryption by using the third key;
Nonce_AS: the resource server random number; and
Nonce_C: the client random number.

Figure 14:
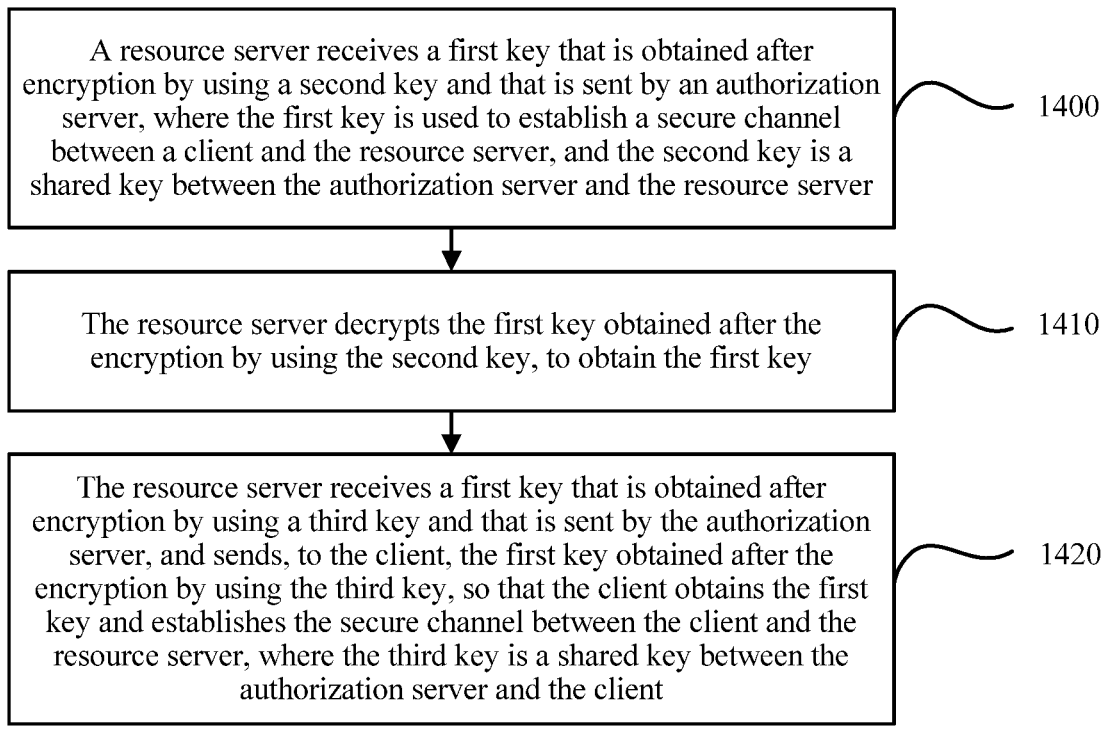
FIG. 14 is another flowchart of key negotiation between a client and a resource server according to an embodiment of the present invention.

Referring to FIG. 14, in an embodiment of the present invention, a process of key negotiation between a client and a resource server, applied to an Internet of Things scenario, is as follows:

Step 1400: A resource server receives a first key that is obtained after encryption by using a second key and that is sent by an authorization server, where the first key is used to establish a secure channel between a client and the resource server, and the second key is a shared key between the authorization server and the resource server.

Step 1410: The resource server decrypts the first key obtained after the encryption by using the second key, to obtain the first key.

Step 1420: The resource server receives a first key that is obtained after encryption by using a third key and that is sent by the authorization server, and sends, to the client, the first key obtained after the encryption by using the third key, so that the client obtains the first key and establishes the secure channel between the client and the resource server, where the third key is a shared key between the authorization server and the client.

After receiving the first key, the resource server obtains the first key by using the preset shared second key between the authorization server and the resource server, a resource server random number, and a preset agreed-on algorithm.

Figure 15:
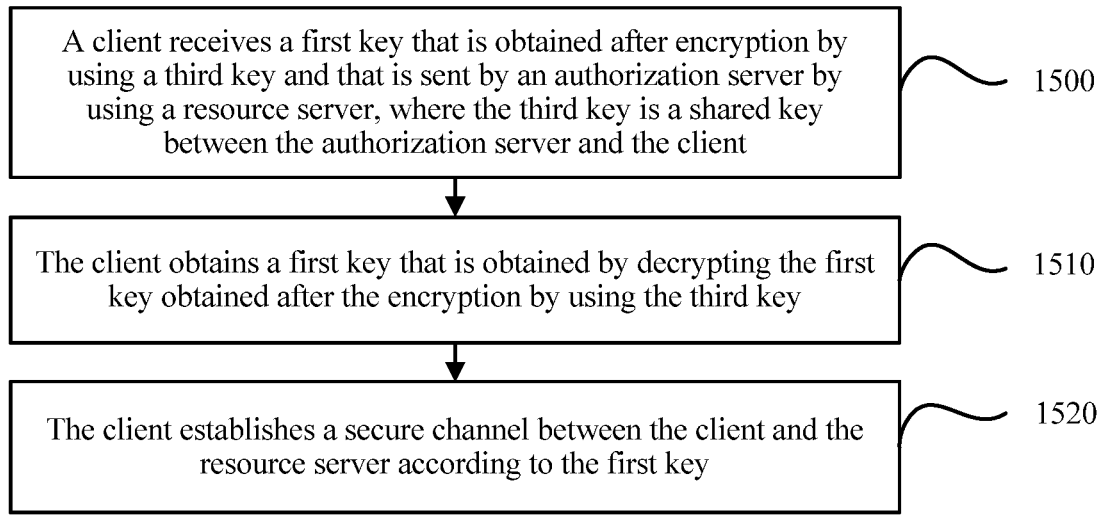
FIG. 15 is another flowchart of key negotiation between a client and a resource server according to an embodiment of the present invention.

Referring to FIG. 15, in an embodiment of the present invention, a process of key negotiation between a client and a resource server, applied to an Internet of Things scenario, is as follows:

Step 1500: A client receives a first key that is obtained after encryption by using a third key and that is sent by an authorization server by using a resource server, where the third key is a shared key between the authorization server and the client.

Step 1510: The client obtains a first key that is obtained by decrypting the first key obtained after the encryption by using the third key.

Step 1520: The client establishes a secure channel between the client and the resource server according to the first key.

In this embodiment of the present invention, before the first key that is obtained after the encryption by using the third key and that is sent by the authorization server by using the resource server is received, the process further includes the following operation: sending a key request to the authorization server, where the key request carries identifier information of the client, and identifier information of the resource server or address information of the resource server.

The key request is transmitted based on the CoAP protocol. An extended Key_Request field or a defined specified Key_Request URI field may be used to indicate that the request is used to request a key between the client and the resource server.

In this embodiment of the present invention, there are multiple manners for obtaining the first key that is obtained by decrypting the first key obtained after the encryption by using the third key. Optionally, the following manner may be used: sending, to an authentication manager, the first key obtained after the encryption by using the third key; and receiving the first key that is obtained by the authentication manager by decrypting the first key obtained after the encryption by using the third key.

Optionally, the following manner may be used specifically as follows.

The client obtains the first key by using the third key, a client random number, and a preset agreed-on algorithm. Certainly, the authentication manager may perform decryption, and send, to the client, the first key obtained after the decryption.

In this embodiment of the present invention, optionally, an initial key may be carried in a K_RS-C field.

In the prior art, a secure channel is established between a client and a resource server based on a key. The key is obtained by the client from an authorization server and then is sent to the resource server. However, when the authorization server cannot communicate with the client, the client cannot obtain the key for establishing the secure channel between the client and the resource server, and therefore cannot establish the secure channel. In the embodiments of the present invention, a resource server obtains, from an authorization server, a key for establishing a secure channel between a client and the resource server, and then sends the key to the client. In this way, the secure channel may be established between the client and the resource server based on the key. This resolves a disadvantage in the prior art. Further, FIG. 13, FIG. 14, and FIG. 15 are respectively described from perspectives of an authorization server, a resource server, and a client, and the foregoing effects can also be implemented.

With reference to the foregoing solutions mentioned in FIG. 1B to FIG. 3A, to avoid a disadvantage that a client cannot access a resource when the client cannot communicate with an authorization server, the present invention provides an embodiment. In this embodiment, a client obtains, by using a resource server, permission to access the resource server. This avoids the disadvantage that the client cannot access the resource when the client cannot communicate with the authorization server.

With reference to the foregoing solutions mentioned in FIG. 4 to FIG. 9, to avoid resource waste and reduce signaling consumption, in the embodiments of the present invention, a resource server may directly obtain authorization information from an authorization server instead of obtaining the authorization information by using a client. Therefore, resource waste is avoided and signaling consumption is reduced.

With reference to the solutions mentioned in FIG. 10 to FIG. 12, to avoid a disadvantage that a client cannot access a key of a resource server when the client cannot communicate with the resource server, in the embodiments of the present invention, a client accesses a resource server by using an authorization server. Therefore, the disadvantage that the client cannot access the key of the resource server when the client cannot communicate with the resource server is avoided.

With reference to the foregoing solutions mentioned in FIG. 13 to FIG. 15, to avoid a disadvantage that a client cannot obtain a key of a resource server when the client cannot communicate with an authorization server, in the embodiments of the present invention, an authorization server sends a key to a client by using a resource server. This resolves the disadvantage that the client cannot obtain the key of the resource server when the client cannot communicate with the authorization server.

Figure 16:
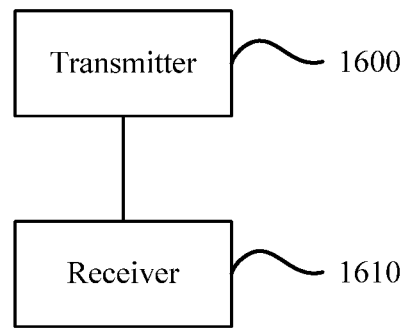
FIG. 16 is a schematic structural diagram of a client according to an embodiment of the present invention.

Based on the foregoing technical solutions, referring to FIG. 16, an embodiment of the present invention correspondingly provides a client. The client is applied to an Internet of Things scenario. The client includes a transmitter 1600 and a receiver 1610.

The transmitter 1600 is configured to send an authorization request to an authorization server.

The transmitter 1600 is further configured to: after determining that an authorization response returned by the authorization server is not received, send a resource access request to a resource server. The resource access request carries first instruction information that is used to instruct the resource server to send the authorization request to the authorization server.

The receiver 1610 is configured to receive a resource access response returned by the resource server. The resource access response is returned according to the resource access request after the resource server sends the authorization request to the authorization server according to the first instruction information and receives the authorization response sent by the authorization server.

Further, the transmitter 1600 is further configured to: send an authorization server address obtaining request to a resource directory server, where the authorization server address obtaining request carries identifier information of the resource server corresponding to the authorization server; and the receiver 1610 is further configured to receive address information of the authorization server that is returned by the resource directory server, where when sending the authorization request to the authorization server, the transmitter 1600 is specifically configured to: send the authorization request to the authorization server according to the address information.

Optionally, the receiver 1610 is specifically configured to: receive an authorization verification failure response returned by the resource server, where the authorization verification failure response carries one or any combination of information that the client has no permission, information that permission owned by the client does not accord with permission requested by the client, or information that a local condition of a request of the client for a resource does not meet a preset rule.

Figure 17:
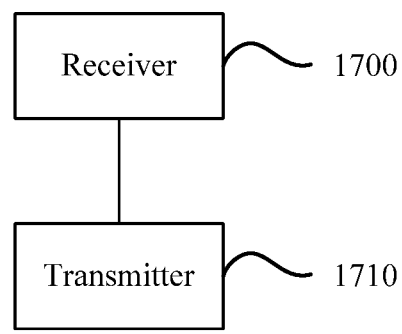
FIG. 17 is a schematic structural diagram of a resource server according to an embodiment of the present invention.

Based on the foregoing technical solutions, referring to FIG. 17, an embodiment of the present invention correspondingly provides a resource server. The resource server is applied to an Internet of Things scenario. The resource server includes a receiver 1700 and a transmitter 1710.

The receiver 1700 is configured to receive a resource access request that is sent by a client after the client fails to receive an authorization response returned by an authorization server. The resource access request carries first instruction information that is used to instruct the resource server to send an authorization request to the authorization server.

The transmitter 1710 is configured to send the authorization request to the authorization server according to the first instruction information.

The receiver 1700 is further configured to receive the authorization response returned by the authorization server.

The transmitter 1710 is further configured to return a resource access response to the client according to the authorization response.

Further, the transmitter 1710 is further configured to: return an authorization verification failure response to the client according to the authorization response, where the authorization verification failure response carries one or any combination of information that the client has no permission, information that permission owned by the client does not accord with permission requested by the client, or information that a local condition of a request of the client for a resource does not meet a preset rule.

Figure 18:
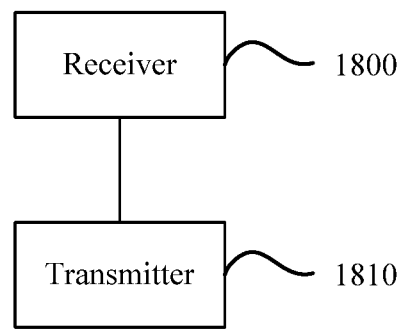
FIG. 18 is a schematic structural diagram of an authorization server according to an embodiment of the present invention.

Based on the foregoing technical solutions, referring to FIG. 18, an embodiment of the present invention correspondingly provides an authorization server. The authorization server is applied to an Internet of Things scenario. The authorization server includes a receiver 1800 and a transmitter 1810.

The receiver 1800 is configured to receive an authorization request that is sent by a client by using a resource server.

The transmitter 1810 is configured to send an authorization response to the resource server according to the authorization request, so that the resource server returns a resource access response to the client according to the authorization response.

Figure 19:
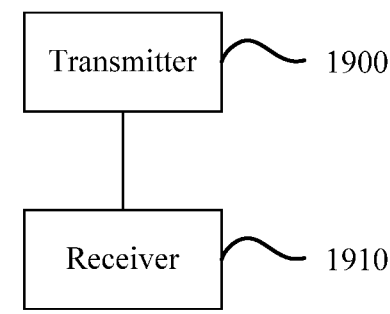
FIG. 19 is another schematic structural diagram of a client according to an embodiment of the present invention.

Based on the foregoing technical solutions, referring to FIG. 19, an embodiment of the present invention correspondingly provides a client. The client is applied to an Internet of Things scenario. The client includes a transmitter 1900 and a receiver 1910.

The transmitter 1900 is configured to send an authorization request to an authorization server. The authorization request carries instruction information that is used to instruct to obtain an authorization information identifier.

The receiver 1910 is configured to receive the authorization information identifier of authorization information that is generated by the authorization server according to the instruction information.

The transmitter 1900 is further configured to send, to a resource server, a resource access request carrying the authorization information identifier.

The receiver 1910 is further configured to receive a resource access response returned by the resource server. The resource access response is returned after the resource server receives, according to the authorization information identifier, an authorization response sent by the authorization server.

Further, the transmitter 1900 is further configured to: send an authorization server address obtaining request to a resource directory server, where the authorization server address obtaining request carries identifier information of the resource server corresponding to the authorization server; and the receiver 1910 is further configured to receive address information of the authorization server that is returned by the resource directory server, where when sending the authorization request to the authorization server, the transmitter 1900 is specifically configured to: send the authorization request to the authorization server according to the address information.

Further, the receiver 1910 is further configured to: receive an authorization verification failure response returned by the resource server, where the authorization verification failure response carries one or any combination of information that the client has no permission, information that permission owned by the client does not accord with permission requested by the client, or information that a local condition of a request of the client for a resource does not meet a preset rule.

Figure 20:
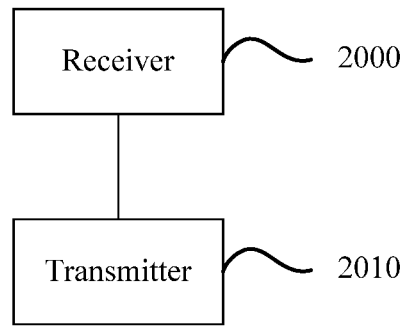
FIG. 20 is another schematic structural diagram of a resource server according to an embodiment of the present invention.

Based on the foregoing technical solutions, referring to FIG. 20, an embodiment of the present invention correspondingly provides a resource server. The resource server is applied to an Internet of Things scenario. The resource server includes a receiver 2000 and a transmitter 2010.

The receiver 2000 is configured to receive a resource access request that carries an authorization information identifier and that is sent by a client. The authorization information identifier is generated by an authorization server according to instruction information that is used to instruct to obtain the authorization information identifier and that is sent by the client.

The transmitter 2010 is configured to receive, according to the authorization information identifier, an authorization response sent by the authorization server.

The transmitter 2010 is further configured to return a resource access response to the client according to the authorization response.

Further, the resource server further includes a processor, where the processor is configured to: parse the authorization information identifier, to obtain digital signature information, where after the digital signature information is successfully verified, the transmitter is further configured to send, to the authorization server, an authorization request carrying an access token identifier; and the receiver is further configured to receive the authorization response that is returned by the authorization server according to the access token identifier.

Further, the transmitter 2010 is further configured to: return an authorization verification failure response to the client according to the authorization response, where the authorization verification failure response carries one or any combination of information that the client has no permission, information that permission supported by the client does not accord with permission requested by the client, or information that a local condition of a request of the client for a resource does not meet a preset rule.

Figure 21:
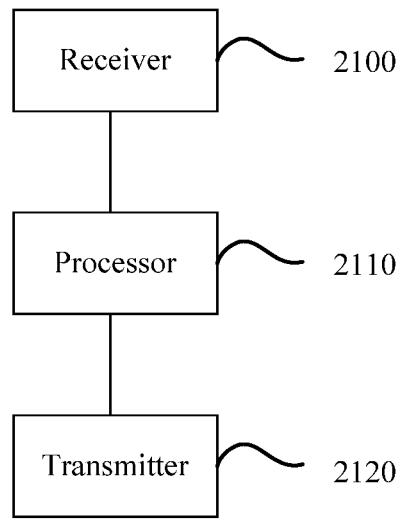
FIG. 21 is another schematic structural diagram of an authorization server according to an embodiment of the present invention.

Based on the foregoing technical solutions, referring to FIG. 21, an embodiment of the present invention correspondingly provides an authorization server. The authorization server is applied to an Internet of Things scenario. The authorization server includes a receiver 2100, a processor 2110, and a transmitter 2120.

The receiver 2100 is configured to receive an authorization request sent by a client. The authorization request carries instruction information that is of the client and that is used to instruct to obtain an authorization information identifier.

The processor 2110 is configured to generate the authorization information identifier of authorization information according to the instruction information.

The transmitter 2120 is configured to send the authorization information identifier to the client.

The receiver 2100 is further configured to receive an authorization request sent by a resource server. The authorization request carries the authorization information identifier.

The transmitter 2120 is further configured to return an authorization response to the resource server according to the authorization information identifier.

Figure 22:
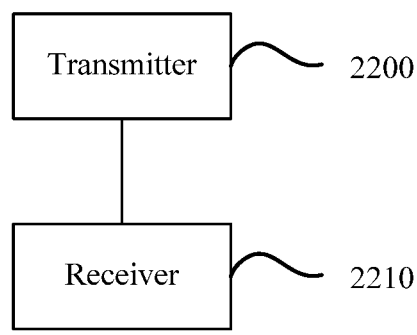
FIG. 22 is another schematic structural diagram of a client according to an embodiment of the present invention.

Based on the foregoing technical solutions, referring to FIG. 22, an embodiment of the present invention correspondingly provides a client. The client is applied to an Internet of Things scenario. The client includes a transmitter 2200 and a receiver 2210.

The transmitter 2200 is configured to send an authorization request to an authorization server. The authorization request carries instruction information that is used to instruct the authorization server to send authorization information to a resource server.

The receiver 2210 is configured to receive an authorization feedback response that is sent by the authorization server after the authorization server sends the authorization information to the resource server.

The transmitter 2200 is further configured to send a resource access request to the resource server according to the authorization feedback response. The resource access request carries identification information identifying that the authorization server has sent the authorization information to the resource server.

The receiver 2210 is further configured to receive a resource access response returned by the resource server. The resource access response is returned according to the authorization information after the resource server obtains, according to the identification information, the authorization information sent by the authorization server.

Further, the transmitter 2200 is further configured to: send an authorization server address obtaining request to a resource directory server, where the authorization server address obtaining request carries identifier information of the resource server corresponding to the authorization server; and the receiver 2210 is further configured to receive address information of the authorization server that is returned by the resource directory server, where when sending the authorization request to the authorization server, the transmitter 2200 is specifically configured to: send the authorization request to the authorization server according to the address information.

Further, the receiver 2210 is further configured to: receive an authorization verification failure response returned by the resource server, where the authorization verification failure response carries one or any combination of information that the client has no permission, information that permission owned by the client does not accord with permission requested by the client, or information that a local condition of a request of the client for a resource does not meet a preset rule.

Figure 23:
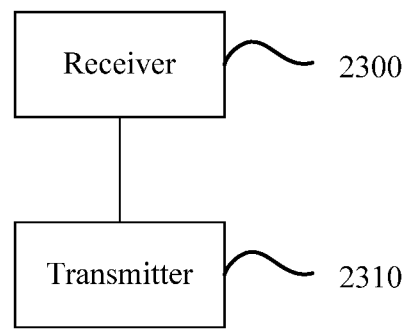
FIG. 23 is another schematic structural diagram of a resource server according to an embodiment of the present invention.

Based on the foregoing technical solutions, referring to FIG. 23, an embodiment of the present invention correspondingly provides a resource server. The resource server is applied to an Internet of Things scenario. The resource server includes a receiver 2300 and a transmitter 2310.

The receiver 2300 is configured to receive authorization information sent by an authorization server. The authorization information is sent by the authorization server according to instruction information that is carried in an authorization request sent by a client, and the instruction information is used to instruct the authorization server to send the authorization information to a resource server.

The receiver 2300 is further configured to receive a resource access request sent by the client. The resource access request carries identification information identifying that the authorization server has sent the authorization information to the resource server.

The transmitter 2310 is configured to return a resource access response to the client. The resource access response is returned according to the authorization information after the authorization information sent by the authorization server is obtained according to the identification information.

Optionally, the transmitter 2310 is configured to: return an authorization verification failure response to the client, where the authorization verification failure response carries one or any combination of information that the client has no permission, information that permission owned by the client does not accord with permission requested by the client, or information that a local condition of a request of the client for a resource does not meet a preset rule.

Figure 24:
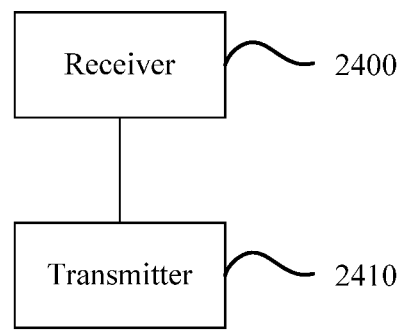
FIG. 24 is another schematic structural diagram of an authorization server according to an embodiment of the present invention.

Based on the foregoing technical solutions, referring to FIG. 24, an embodiment of the present invention correspondingly provides an authorization server. The authorization server is applied to an Internet of Things scenario. The authorization server includes a receiver 2400 and a transmitter 2410.

The receiver 2400 is configured to receive an authorization request sent by a client. The authorization request carries instruction information that is used to instruct the authorization server to send authorization information to a resource server.

The transmitter 2410 is configured to send the authorization information to the resource server according to the instruction information, so that the resource server returns a resource access response to the client according to the authorization information.

Figure 25:
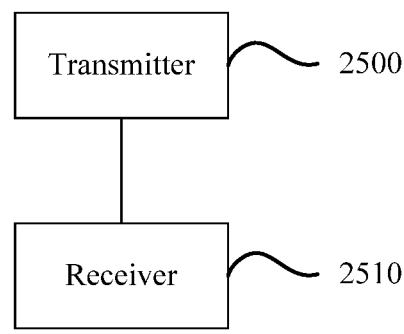
FIG. 25 is another schematic structural diagram of a client according to an embodiment of the present invention.

Based on the foregoing technical solutions, referring to FIG. 25, an embodiment of the present invention correspondingly provides a client. The client is applied to an Internet of Things scenario. The client includes a transmitter 2500 and a receiver 2510.

The transmitter 2500 is configured to send a resource access request to an authorization server.

The receiver 2510 is configured to receive a resource access response returned by the authorization server. The resource access response is sent by a resource server to the authorization server after the authorization server successfully verifies the resource access response and sends the resource access response to the resource server and after the resource server successfully verifies the resource access request and sends the resource access request to the authorization server.

Further, the transmitter 2500 is further configured to: send an authorization server address obtaining request to a resource directory server, where the authorization server address obtaining request carries identifier information of the resource server corresponding to the authorization server; and the receiver 2510 is further configured to receive address information of the authorization server that is returned by the resource directory server, where when sending the resource access request to the authorization server, the transmitter 2500 is specifically configured to: send the resource access request to the authorization server according to the address information.

Figure 26:
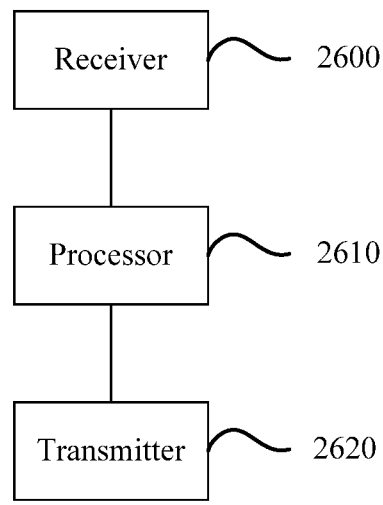
FIG. 26 is another schematic structural diagram of a resource server according to an embodiment of the present invention.

Based on the foregoing technical solutions, referring to FIG. 26, an embodiment of the present invention correspondingly provides a resource server. The resource server is applied to an Internet of Things scenario. The resource server includes a receiver 2600, a processor 2610, and a transmitter 2620.

The receiver 2600 is configured to receive a resource access request that carries authorization information and that is sent by an authorization server. The resource access request is sent after the authorization server successfully verifies the resource access request sent by a client.

The processor 2610 is configured to verify the authorization information, and generate a resource access response.

The transmitter 2620 is configured to return the resource access response to the client by using the authorization server.

Optionally, the processor 2610 is specifically configured to: verify the authorization information, and generate an authorization verification failure response, where the authorization verification failure response carries one or any combination of information that the client has no permission, information that permission supported by the client does not accord with permission requested by the client, or information that a local condition of a request of the client for a resource does not meet a preset rule.

Figure 27:
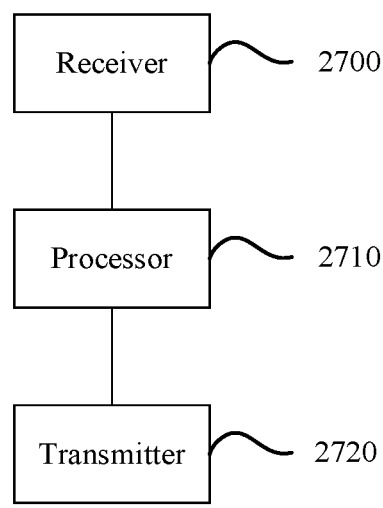
FIG. 27 is another schematic structural diagram of an authorization server according to an embodiment of the present invention.

Based on the foregoing technical solutions, referring to FIG. 27, an embodiment of the present invention correspondingly provides an authorization server. The authorization server is applied to an Internet of Things scenario. The authorization server includes a receiver 2700, a processor 2710, and a transmitter 2720.

The receiver 2700 is configured to receive a resource access request sent by a client.

The processor 2710 is configured to generate authorization information after the resource access request is successfully verified.

The transmitter 2720 is configured to add the authorization information to the resource access request, and send the resource access request to a resource server.

The receiver 2700 is further configured to receive a resource access response returned by the resource server, and send the resource access response to the client.

Optionally, the receiver 2700 is specifically configured to: receive an authorization verification failure response returned by the resource server; and the transmitter 2720 is further configured to send the authorization verification failure response to the client, where the authorization verification failure response carries one or any combination of information that the client has no permission, information that permission owned by the client does not accord with permission requested by the client, or information that a local condition of a request of the client for a resource does not meet a preset rule.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

Alternatively, these computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A resource access method, applied to an Internet of Things scenario, comprising:
    sending, by a client device, a request for an unauthorized resource to a resource server;
    receiving, by the client device from the resource server, receiving address information of an authorization server;
    sending, by the client device to the authorization server according to the received address information of the authorization server, an authorization request carrying instruction information for obtaining a resource authorization;

receiving, by the client device, an authorization information identifier of authorization information issued by the authorization server, wherein the client device does not receive the authorization information corresponding to the authorization information identifier, the authorization information corresponding to the authorization information identifier is generated by the authorization server in response to the authorization request, and the authorization server allocates the authorization information identifier to the authorization information after generating the authorization information;

sending, by the client device to a resource server, a resource access request carrying the authorization information identifier; and receiving, by the client device, a resource access response returned by the resource server, wherein the resource access response is sent after the resource server sends an authorization request to the authorization server and receives an authorization response sent by the authorization server, and wherein when an authorization verification of the authorization request by the authorization server succeeds, the authorization response comprises the authorization information.

2. The method according to claim 1, wherein receiving, by the client device, the resource access response returned by the resource server comprises:

receiving an authorization verification failure response returned by the resource server, wherein the authorization verification failure response carries one or any combination of: information that the client device has no permission, information that permission owned by the client device does not accord with permission requested by the client device, or information that a local condition of a request of the client device for the resource does not meet a preset rule.

3. The method according to claim 1, wherein the client device is an unconstrained node.

4. The method according to claim 1, wherein a size of the authorization information identifier is less than a size of the authorization information.

5. The method according to claim 1, wherein the authorization information comprises an access token.

6. The method according to claim 1, wherein the authorization information comprises an access token, an identifier of the client device, and an address of a resource to be accessed by the client device.

7. The method according to claim 1, wherein the authorization information identifier carries an access token identifier and a digital signature of the authorization server.

8. A client device, applied to an Internet of Things scenario, comprising:

a memory storing executable instructions;

a processor configured to execute the executable instructions to perform operations of:

sending a request for an unauthorized resource to a resource server;

receiving, from the resource server, receiving address information of an authorization server;

sending an authorization request to the authorization server according to the received address information of the authorization server, wherein the authorization request carries instruction information for obtaining a resource authorization;

receiving an authorization information identifier of authorization information issued by the authorization server, wherein the client device does not receive the authorization information corresponding to the authorization information identifier, the authorization information corresponding to the authorization information identifier is generated by the authorization server in response to the authorization request, and the authorization server allocates the authorization information identifier to the authorization information after generating the authorization information;

sending, to a resource server, a resource access request carrying the authorization information identifier; and receiving a resource access response sent by the resource server, wherein the resource access response is sent after the resource server sends an authorization request to the authorization server and receives an authorization response sent by the authorization server, and wherein when an authorization verification of the authorization request by the authorization server succeeds, the authorization response comprises the authorization information.

9. The client device according to claim 8, wherein the processor is configured to execute the executable instructions to perform operations of:

receiving an authorization verification failure response returned by the resource server, wherein the authorization verification failure response carries one or any combination of: information that the client device has no permission, information that permission owned by the client device does not accord with permission requested by the client device, or information that a local condition of a request of the client device for the resource does not meet a preset rule.

10. The client device according to claim 8, wherein the client device is an unconstrained node.

11. The client device according to claim 8, wherein a size of the authorization information identifier is less than a size of the authorization information.

12. The client device according to claim 8, wherein the authorization information comprises an access token.

13. The client device according to claim 8, wherein the authorization information comprises an access token, an identifier of the client device, and an address of a resource to be accessed by the client device.

14. The client device according to claim 8, wherein the authorization information identifier carries an access token identifier and a digital signature of the authorization server.

15. A resource server, applied to an Internet of Things scenario, comprising:

a memory storing executable instructions;

a processor configured to execute the executable instructions to perform operations of:

receiving a request for an unauthorized resource from a client device;

sending receiving address information of an authorization server to the client device;

receiving a resource access request that carries an authorization information identifier from the client device, wherein the authorization information identifier is issued by the authorization server, the client device does not receive authorization information corresponding to the authorization information identifier, the authorization information corresponding to the authorization information identifier is generated by the authorization server in response to a first authorization request received by the authorization server from the client device, and the authorization server allocates the authorization information identifier to the authorization information after generating the authorization information;

sending a second authorization request to the authorization server, wherein the second authorization request comprises the authorization information identifier;

receiving an authorization response from the authorization server, wherein when an authorization verification of the second authorization request by the authorization server succeeds, the authorization response comprises the authorization information; and sending a resource access response to the client device according to the authorization response.

16. An authorization system, applied to an Internet of Things scenario, comprising:

a resource server comprising:
a first memory storing first executable instructions; and
a first processor configured to execute the first executable instructions to perform operations of:
receiving a request for an unauthorized resource from a client device;
sending receiving address information of an authorization server to the client device;
receiving a resource access request that carries an authorization information identifier from the client device, wherein the authorization information identifier is issued by the authorization server, and wherein the client device does not receive authorization information corresponding to the authorization information identifier from the authorization server, the authorization information corresponding to the authorization information identifier is generated by the authorization server in response to a first authorization request that is received by the authorization server from the client device, and the authorization server allocates the authorization information identifier to the authorization information after generating the authorization information;

sending a second authorization request to the authorization server, wherein the second authorization request comprises the authorization information identifier;

receiving an authorization response from the authorization server, wherein when an authorization verification of the second authorization request by the authorization server succeeds, the authorization response comprises the authorization information; and sending a resource access response to the client device according to the authorization response; and an authorization server comprising:
a second memory storing second executable instructions; and
a second processor configured to execute the second executable instructions to perform operations of:
receiving the second authorization request from the resource server, wherein the second authorization request carries the authorization information identifier; and
sending the authorization response to the resource server according to the authorization information identifier.

17. The authorization system according to claim 16, wherein the client device is an unconstrained node.

18. The authorization system according to claim 16, wherein a size of the authorization information identifier is less than a size of the authorization information.

19. The authorization system according to claim 16, wherein the authorization information comprises an access token.

20. The authorization system according to claim 16, wherein the authorization information comprises an access token, an identifier of the client device, and an address of a resource to be accessed by the client device.

* * * * *

UNITED STATES PATENT AND TRADEMARK OFFICE
CERTIFICATE OF CORRECTION

PATENT NO. : 11,812,264 B2
APPLICATION NO. : 17/373460
DATED : November 7, 2023
INVENTOR(S) : Kepeng Li It is certified that error appears in the above-identified patent and that said Letters Patent is hereby corrected as shown below:

On the Title Page

Item (73), in Column 1, in "Assignee", Line 2, delete "Gul'an" and insert -- Gui'an --.

Signed and Sealed this
Thirtieth Day of January, 2024

Katherine Kelly Vidal
*Director of the United States Patent and Trademark Office*